(12) United States Patent
Furuta

(10) Patent No.: US 11,814,036 B2
(45) Date of Patent: Nov. 14, 2023

(54) CONTROL METHOD OF VEHICLE AND CONTROL APPARATUS THEREOF

(71) Applicant: TOYOTA JIDOSHA KABUSHIKI KAISHA, Toyota (JP)

(72) Inventor: Hiroki Furuta, Numazu (JP)

(73) Assignee: TOYOTA JIDOSHA KABUSHIKI KAISHA, Toyota Aichi-ken (JP)

( * ) Notice: Subject to any disclaimer, the term of this patent is extended or adjusted under 35 U.S.C. 154(b) by 71 days.

(21) Appl. No.: 17/512,068

(22) Filed: Oct. 27, 2021

(65) Prior Publication Data

US 2022/0135021 A1 May 5, 2022

(30) Foreign Application Priority Data

Oct. 29, 2020 (JP) .................................. 2020-181762

(51) Int. Cl.
  *B60W 30/02* (2012.01)
  *B60W 10/22* (2006.01)
  *B60W 40/06* (2012.01)
  *B60W 40/08* (2012.01)
  *B60W 40/103* (2012.01)

(52) U.S. Cl.
  CPC ............ *B60W 30/02* (2013.01); *B60W 10/22* (2013.01); *B60W 40/06* (2013.01); *B60W 40/08* (2013.01); *B60W 40/103* (2013.01); *B60W 2510/202* (2013.01); *B60W 2520/14* (2013.01); *B60W 2540/10* (2013.01); *B60W 2540/12* (2013.01)

(58) Field of Classification Search
  CPC ..................................................... B60W 10/22
  See application file for complete search history.

(56) References Cited

U.S. PATENT DOCUMENTS

| | | |
|---|---|---|
| 2005/0270145 A1 | 12/2005 | Kataoka et al. |
| 2009/0097038 A1 | 4/2009 | Higgins-Luthman et al. |
| 2010/0324780 A1 | 12/2010 | Koumura et al. |
| 2015/0352920 A1* | 12/2015 | Lakehal-Ayat ...... B60G 17/018 701/38 |
| 2016/0311464 A1 | 10/2016 | Yamaoka |
| 2017/0349023 A1 | 12/2017 | Mori |
| 2018/0154723 A1 | 6/2018 | Anderson et al. |
| 2018/0162186 A1 | 6/2018 | Anderson et al. |
| 2019/0079539 A1 | 3/2019 | Sridhar et al. |
| 2019/0311272 A1 | 10/2019 | Kamata et al. |
| 2020/0139784 A1* | 5/2020 | Sridhar .................. B60G 21/08 |

(Continued)

FOREIGN PATENT DOCUMENTS

| | | |
|---|---|---|
| JP | H04-339010 A | 11/1992 |
| JP | 2008-195402 A | 8/2008 |

(Continued)

*Primary Examiner* — Imran K Mustafa
(74) *Attorney, Agent, or Firm* — Dinsmore & Shohl LLP

(57) ABSTRACT

A control method of a vehicle includes determining a look-ahead time, calculating a predicted passage position by using specific vehicle information having at least a position of a wheel at the current time point, velocity of the vehicle, and the proceeding direction of the vehicle, acquiring a road surface displacement-associated value at the predicted passage position, calculating a final target control force based on the road surface displacement-associated value at the predicted passage position, and controlling a control force generator based on the final target control force.

17 Claims, 13 Drawing Sheets

(56) References Cited

U.S. PATENT DOCUMENTS

2021/0354523 A1\* 11/2021 Hirao .................. F16F 15/02
2022/0032720 A1\* 2/2022 Hirao .................. B60G 17/08

FOREIGN PATENT DOCUMENTS

| JP | 2009-096366 A | 5/2009 |
|----|---------------|--------|
| JP | 2009-190464 A | 8/2009 |
| JP | 4349210 B2 | 10/2009 |
| JP | 2010-006279 A | 1/2010 |
| JP | 2011-183919 A | 9/2011 |
| JP | 2016-107778 A | 6/2016 |
| JP | 2016-207060 A | 12/2016 |
| JP | 2017-074823 A | 4/2017 |
| JP | 2017-217933 A | 12/2017 |
| JP | 2018-154283 A | 10/2018 |
| JP | 2019-101534 A | 6/2019 |
| JP | 2019-182093 A | 10/2019 |
| JP | 2020-016541 A | 1/2020 |

\* cited by examiner

CONTROL METHOD OF VEHICLE AND CONTROL APPARATUS THEREOF

CROSS-REFERENCE TO RELATED APPLICATION

This application claims priority to Japanese Patent Application No. 2020-181762 filed on Oct. 29, 2020, incorporated herein by reference in its entirety.

BACKGROUND

1. Technical Field

The present disclosure relates to a control method of a vehicle and a control apparatus thereof that are used for damping vibration in a sprung portion of a vehicle.

2. Description of Related Art

An apparatus that controls an actuator provided in a wheel by using information on a vertical displacement of a road surface (a road surface displacement) through which the wheel is predicted to pass, thereby reducing vibration in a sprung portion of a vehicle has been proposed. Such control is also referred to as a "preview vibration damping control".

For example, a related art apparatus calculates, based on a planned route of a vehicle, a route through which a wheel passes and controls an active suspension actuator based on the route (see, for example, US 2018-154723 A).

SUMMARY

The inventors have examined a method and an apparatus that execute a preview vibration damping control based on data in which position information indicating a position of a road surface is associated with a value associated with a vertical displacement of the road surface at the position of the road surface indicated by the position information (a "road surface displacement-associated value" to be described below).

In the preview vibration damping control, it is necessary to predict, with high accuracy, a position through which the wheel passes at a future time point. For example, it is assumed that the predicted position of the wheel deviates relatively significantly from a position through which the wheel actually passes. In this case, since the preview vibration damping control is executed by using a road surface displacement-associated value different from an actual road surface displacement-associated value, it is difficult that vibration in the sprung portion of the vehicle is effectively reduced.

The present disclosure provides a control method of a vehicle and a control apparatus thereof that can predict, with high accuracy, a position through which a wheel will pass and execute a preview vibration damping control.

A first aspect of the present disclosure is a control method of a vehicle. The vehicle includes a control force generator configured to generate a control force between a wheel and a vehicle body portion corresponding to a position of the wheel, and an electronic control unit configured to control the control force generator. The control force is a force in the vertical direction is for damping vibration of the vehicle body portion in a sprung portion of the vehicle. The control method has determining, by the electronic control unit, a look-ahead time that is a time for predicting a position through which the wheel passes in the future and is a time difference between a current time point and a future time point. The control method has calculating, by the electronic control unit, a predicted passage position through which the wheel is predicted to pass at a time point by using the look ahead time and specific vehicle information having a position of the wheel at the current time point, velocity of the vehicle, and a proceeding direction of the vehicle. The time point is a time point at which the look-ahead time has elapsed since the current time point. The control method has acquiring, by the electronic control unit, a road surface displacement-associated value at the predicted passage position from road surface information that is data in which position information is associated with the road surface displacement-associated value. The position information indicates a position of a road surface and the road surface displacement-associated value is associated with a vertical displacement of the road surface at the position indicated by the position information. The control method has calculating, by the electronic control unit, a final target control force based on the road surface displacement-associated value at the predicted passage position, and controlling, by the electronic control unit, the control force generator based on the final target control force.

According to the above first aspect, it is possible to calculate, with high accuracy, the predicted passage position by using the specific vehicle information (the position of the wheel at the current time point, and the velocity and the proceeding direction of the vehicle). It is possible to reduce vibration in the sprung portion by executing preview vibration damping control using the highly accurate predicted passage position.

In the first aspect, the predicted passage position may be obtained by using, as the specific vehicle information, at least one of acceleration of the vehicle, a yaw rate of the vehicle, and a body slip angle of the vehicle.

With the above configuration, as the specific vehicle information, it is possible to calculate, with higher accuracy, the predicted passage position by further using at least one of the acceleration of the vehicle, and the yaw rate and the body slip angle of the vehicle.

In the first aspect, the control method may further include a step of estimating, by the electronic control unit, a level of reliability of the predicted passage position. The level of the reliability may be a first level at which the reliability is estimated to be high and a second level at which the reliability is estimated to be lower than the reliability of the first level. The final target control force may be calculated such that a second degree is lower than a first degree. The first degree may be degree of influence on the final target control force by the road surface displacement-associated value at the predicted passage position when the level of the reliability is the first level than when the level of the reliability is the first level. The second degree may be a degree of influence on the final target control force by the road surface displacement-associated value at the predicted passage position when the level of the reliability is the first level than when the level of the reliability is the second level.

When the level of reliability is the second level, a deviation may occur between the predicted passage position and the position through which the wheel actually passes. In such a case, when the preview vibration damping control is executed by using the road surface displacement-associated value at the predicted passage position, vibration in the sprung portion may worsen. With the above configuration, when the level of reliability is the second level, the degree of influence of the road surface displacement-associated value at the predicted passage position on the final target control force becomes lower. Therefore, it is possible to reduce a possibility that vibration in the sprung portion may worsen.

In the first aspect, the control method may further has estimating, by the electronic control unit, a level of reliability of the predicted passage position. The level of the reliability may be a first level at which the reliability is estimated to be high and a second level at which the reliability is estimated to be lower than the reliability of the first level. The final target control force may be calculated based on a first target control force when the level of the reliability is the first level. The final target control force may be calculated based on the first target control force and a second target control force when the level of the reliability is the second level. The first target control force may be a control force that is calculated based on the road surface displacement-associated value at the predicted passage position. The second target control force may be at least one of a feedback control force for damping vibration in the sprung portion and a control force which is calculated by using the road surface displacement-associated value in front of the wheel acquired by a sensor provided in the vehicle. The final target control force may be calculated such that a second degree is lower than a first degree. The first degree may be a degree of influence of the first target control force on the final target control force is lower when the level of the reliability is the first level. The second degree may be a degree of influence of the first target control force on the final target control force is lower when the level of the reliability is the second level.

With the above configuration, when the level of reliability is the second level, the degree of influence of the first target control force on the final target control force becomes lower. Therefore, it is possible to reduce the possibility that vibration in the sprung portion may worsen. In addition, it is possible to restrain vibration in the sprung portion by using the second target control force.

In the first aspect, the control method may further have estimating, by the electronic control unit, a level of reliability of the predicted passage position. The level of the reliability may have a first level at which the reliability is estimated to be high and a second level at which the reliability is estimated to be lower than the reliability of the first level. When the level of the reliability is the second level, the predicted passage position may be calculated by using, as the specific vehicle information, at least one of acceleration of the vehicle, a yaw rate of the vehicle, and a body slip angle of the vehicle.

With the above configuration, when the level of reliability is the second level, it is possible to calculate, with higher accuracy, the predicted passage position by further using, as the specific vehicle information, at least one of the acceleration of the vehicle, and the yaw rate and the body slip angle of the vehicle.

In the first aspect, the level of the reliability may be estimated to be the first level when the look-ahead time is equal to or less than a predetermined time threshold value, and the level of the reliability may be estimated to be the second level when the look-ahead time is greater than the predetermined time threshold value.

In the first aspect, based on information on a driving operation amount by a driver, the level of reliability may be estimated to be the first level when the magnitude of the driving operation amount is equal to or less than a predetermined operation amount threshold value, and the level of reliability may be estimated to be the second level when the magnitude of the driving operation amount is greater than the predetermined operation amount threshold value.

In the first aspect, based on information on a traveling state amount of the vehicle, the level of the reliability may be estimated to be the first level when the magnitude of the traveling state amount is equal to or less than a predetermined traveling state threshold value, and the level of the reliability may be estimated to be the second level when the magnitude of the traveling state amount is greater than the predetermined traveling state threshold value.

In the first aspect, based on a movement distance of the wheel during a time period from the current time point to a time point at which the look-ahead time has elapsed, the level of the reliability may be estimated to be the first level when the movement distance is equal to or less than a predetermined distance threshold value, and the level of the reliability may be estimated to be the second level when the movement distance is greater than the predetermined distance threshold value.

In the first aspect, the control method may further have executing, by the electronic control unit, a driving assistance control that has a steering control changing a steering angle of the vehicle such that the vehicle travels along a predetermined target traveling line. When an operation state of the driving assistance control is in an off state, traveling state information being information on the proceeding direction may be acquired from an information acquisition device mounted on the vehicle and the predicted passage position may be calculated by using the traveling state information, and when the operation state of the driving assistance control is in an on state, the predicted passage position may be calculated by using the target traveling line as the proceeding direction.

With the above configuration, it is possible to continue the preview vibration damping control while switching the information adopted as the proceeding direction of the vehicle between the target traveling line and the traveling state information according to the operation state of the driving assistance control. Further, when the operation state of the driving assistance control is in the on state, it is possible to calculate a highly accurate predicted passage position by using the target traveling line as the proceeding direction of the vehicle.

In the first aspect, the control method may further include the step of estimating, by the electronic control unit, a level of reliability of the predicted passage position. The level of the reliability may have the first level at which the reliability is estimated to be high and the second level at which the reliability is estimated to be lower than the reliability of the first level. Based on the operation state of the driving assistance control being in an on state, the predicted passage position may be calculated by using the traveling state information when the level of the reliability is the first level and the predicted passage position may be calculated by using the target traveling line when the level of the reliability is the second level.

With the above configuration, when the level of reliability is the second level, it is possible to calculate the predicted passage position by using more highly accurate information (the target traveling line).

In the first aspect, the look-ahead time may be calculated based on a calculation delay time until a control command about the final target control force is transmitted to the control force generator and based on a response delay time from a first time to a second time. The first time may be a time at which the control command is transmitted to the control force generator and the second time may be a time at which the control force generator actually generates the control force corresponding to the final target control force.

In the first aspect, the road surface displacement-associated value may have at least one of a road surface displacement indicating a displacement of the road surface in the vertical direction, a road surface displacement velocity indicating a time differential value of the road surface displacement, an unsprung displacement indicating a displacement at an unsprung portion of the vehicle in the vertical direction, and an unsprung velocity indicating a time differential value of the unsprung displacement.

A second aspect of the present disclosure is a control apparatus of a vehicle. The vehicle includes a control force generator configured to generate a control force between a wheel and a vehicle body portion corresponding to a position of the wheel. The control force is a force in the vertical direction for damping vibration in the vehicle body portion of the sprung portion of the vehicle. The control apparatus includes an electronic control unit configured to control the control force generator. The electronic control unit is configured to determine a look-ahead time that is a time for predicting a position through which the wheel passes in the future and is a time difference between a current time point and a future time point, and calculate a predicted passage position through which the wheel is predicted to pass at a time point by using the look-ahead time and specific vehicle information having a current position of the wheel, velocity of the vehicle, and a proceeding direction of the vehicle, and the time point is a time point at which the look-ahead time has elapsed since the current time point. The electronic control unit is configured to acquire the road surface displacement-associated value at the predicted passage position from road surface information that is data in which position information indicating a position of a road surface, is associated with a road surface displacement-associated value. The position information indicates a position of a road surface, and the road surface displacement-associated value (63b) is associated with a vertical displacement of the road surface in the position indicated by the position information. The electronic control unit is configured to calculate a final target control force based on the road surface displacement-associated value at the predicted passage position, and control the control force generator based on the final target control force.

In another aspect of the disclosure, the electronic control unit may be implemented by a microprocessor programmed to execute one or more of the functions described in the present specification. In still another aspect of the disclosure, the electronic control unit may be implemented entirely or partially by an integrated circuit specialized for one or more applications, that is, hardware composed of an ASIC or the like.

In the above description, to the components corresponding to one or more embodiments to be described below, the names and/or symbols used in the embodiments are added in parentheses. However, each component is not limited to the embodiments defined by the names and/or symbols. Other purposes, other features, and concomitant benefits of the present disclosure will be readily understood from the description of one or more embodiments described with reference to the drawings below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A control method of a vehicle according to the present disclosure is executed by various vibration damping control apparatuses to be disclosed hereinbelow.

First Embodiment

Configuration of Vibration Damping Control Apparatus

The vibration damping control apparatus according to a first embodiment (hereinafter, sometimes referred to as a "first apparatus") is applied to a vehicle 10 illustrated in FIG. 1. As illustrated in FIG. 2, hereinafter, this vibration damping control apparatus will also be referred to as a "vibration damping control apparatus 20".

Figure 1:
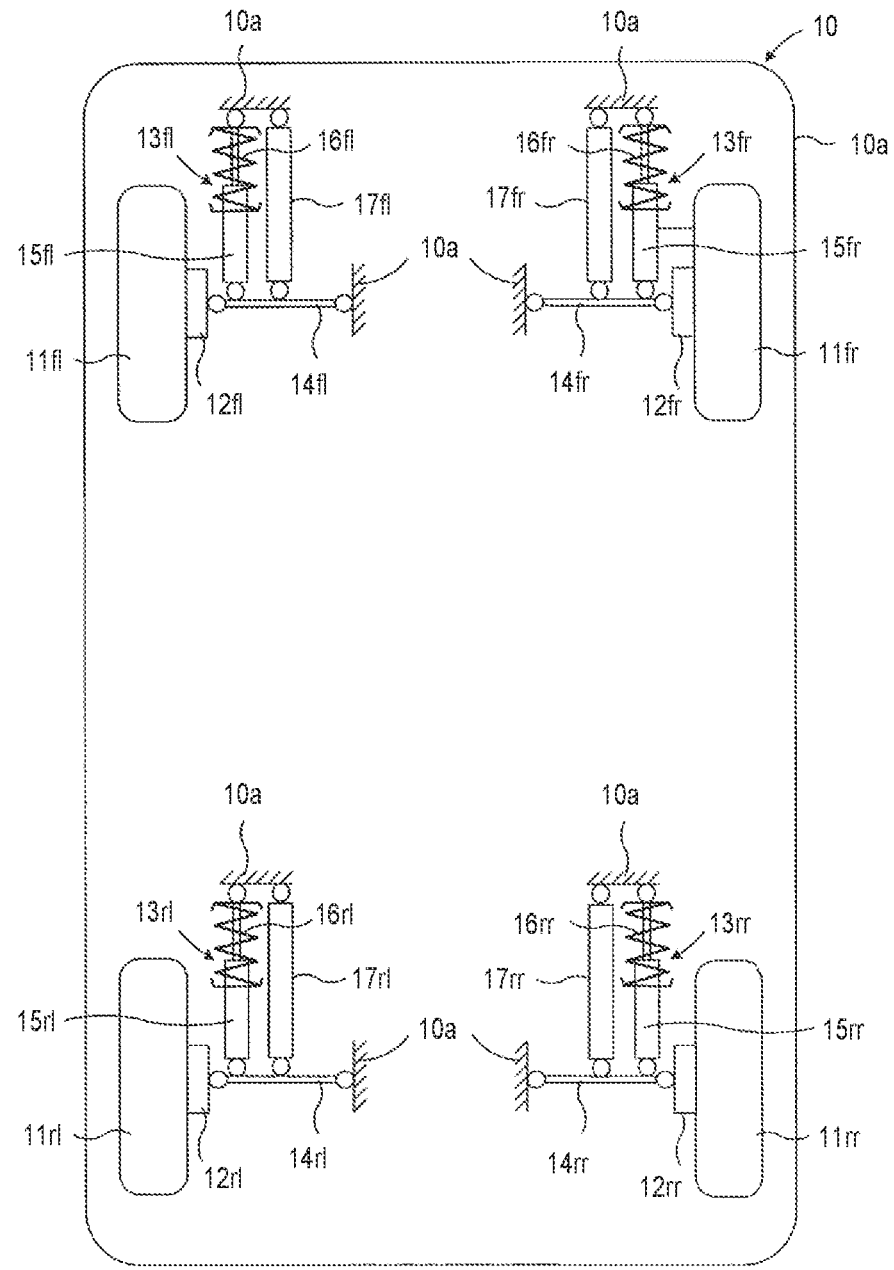
FIG. 1 is a schematic configuration diagram of a vehicle to which a vibration damping control apparatus according to a first embodiment is applied.
Figure 2:
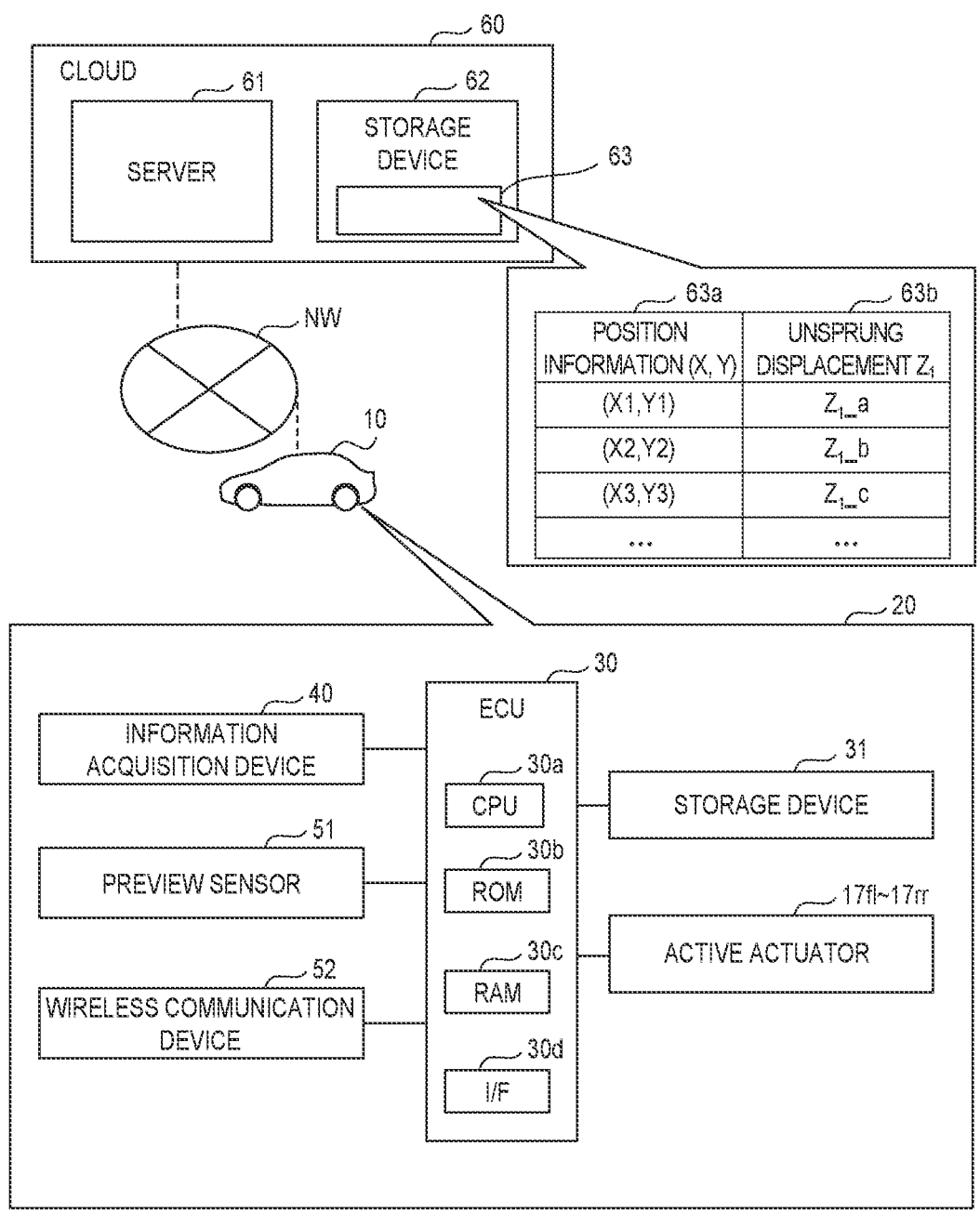
FIG. 2 is a schematic configuration diagram of the vibration damping control apparatus according to the first embodiment.

As illustrated in FIG. 1, the vehicle 10 includes a left front wheel 11$fl$, a right front wheel 11$fr$, a left rear wheel 11$rl$, and a right rear wheel 11$rr$. Each of the left front wheel 11$fl$, the right front wheel 11$fr$, the left rear wheel 11$rl$, and the right rear wheel 11*rr* is referred to as a "wheel 11" when it is not necessary to distinguish them from each other.

Further, hereinafter, any one of the left front wheel 11*fl* and the right front wheel 11*fr* may be referred to as a "front wheel 11*f*". Similarly, any one of the left rear wheel 11*rl* and the right rear wheel 11*rr* may be referred to as a "rear wheel 11*r*". The subscript "f" indicates that it corresponds to any one of the left front wheel 11*fl* and the right front wheel 11*fr*, and the subscript "r" indicates that it corresponds to any one of the left rear wheel 11*rl* and the right rear wheel 11*rr*. Further, the subscripts "fl", "fr", "rl", and "rr" indicate that they correspond to the left front wheel 11*fl*, the right front wheel 11*fr*, the left rear wheel 11*rl*, and the right rear wheel 11*rr*, respectively.

The left front wheel 11*fl* is rotatably supported to a vehicle body 10*a* by a wheel support member 12*fl*. The right front wheel 11*fr* is rotatably supported to the vehicle body 10*a* by a wheel support member 12*fr*. The left rear wheel 11*rl* is rotatably supported to the vehicle body 10*a* by a wheel support member 12*rl*. The right rear wheel 11*rr* is rotatably supported to the vehicle body 10*a* by a wheel support member 12*rr*. Hereinafter, each of the wheel support members 12*fl* to 12*rr* will be referred to as a "wheel support member 12" when it is not necessary to distinguish them from each other.

The vehicle 10 further includes a left front wheel suspension 13*fl*, a right front wheel suspension 13*fr*, a left rear wheel suspension 13*r*1, and a right rear wheel suspension 13*rr*. Details of the suspensions 13*fl* to 13*rr* will be described below. The suspensions 13*fl* to 13*rr* are independent-type suspensions, but other types of suspensions may be used.

The left front wheel suspension 13*fl* suspends the left front wheel 11*fl* from the vehicle body 10*a*, and includes a suspension arm 14*fl*, a shock absorber 15*fl*, and a suspension spring 16*fl*. The right front wheel suspension 13*fr* suspends the right front wheel 11*fr* from the vehicle body 10*a*, and includes a suspension arm 14*fr*, a shock absorber 15*fr*, and a suspension spring 16*fr*.

The left rear wheel suspension 13*r*1 suspends the left rear wheel 11*rl* from the vehicle body 10*a*, and includes a suspension arm 14*r*1, a shock absorber 15*r*1, and a suspension spring 16*r*1. The right rear wheel suspension 13*rr* suspends the right rear wheel 11*rr* from the vehicle body 10*a*, and includes a suspension arm 14*rr*, a shock absorber 15*rr*, and a suspension spring 16*rr*.

Each of the left front wheel suspension 13*fl*, the right front wheel suspension 13*fr*, the left rear wheel suspension 13*r*1, and the right rear wheel suspension 13*rr* is referred to as a "suspension 13" when it is not necessary to distinguish them from each other. Similarly, each of the suspension arms 14*fl* to 14*rr* is referred to as a "suspension arm 14". Similarly, each of the shock absorbers 15*fl* to 15*rr* is referred to as a "shock absorber 15". Similarly, each of the suspension springs 16*fl* to 16*rr* is referred to as a "suspension spring 16".

The suspension arm 14 connects the wheel support member 12 to the vehicle body 10*a*. In FIG. 1, one suspension arm 14 is provided to one suspension 13. In another example, a plurality of suspension arms 14 may be provided to one suspension 13.

The shock absorber 15 is provided between the vehicle body 10*a* and the suspension arm 14. The upper end of the shock absorber 15 is connected to the vehicle body 10*a*, and the lower end of the shock absorber 15 is connected to the suspension arm 14. The suspension spring 16 is provided between the vehicle body 10*a* and the suspension arm 14 via the shock absorber 15. In other words, the upper end of the suspension spring 16 is connected to the vehicle body 10*a*, and the lower end thereof is connected to a cylinder of the shock absorber 15. In such a configuration of the suspension spring 16, the shock absorber 15 may be provided between the vehicle body 10*a* and the wheel support member 12.

In this example, the shock absorber 15 is a shock absorber with a non-variable damping force. In another example, the shock absorber 15 may be a shock absorber with a variable damping force. Further, the suspension spring 16 may be provided between the vehicle body 10*a* and the suspension arm 14 without the shock absorber 15. In other words, the upper end of the suspension spring 16 may be connected to the vehicle body 10*a*, and the lower end thereof may be connected to the suspension arm 14. In such a configuration of the suspension spring 16, the shock absorber 15 and the suspension spring 16 may be provided between the vehicle body 10*a* and the wheel support member 12.

Figure 5:
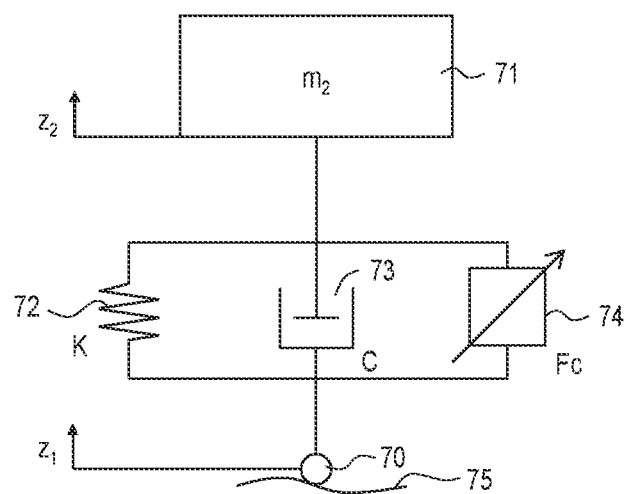
FIG. 5 is a diagram illustrating a single wheel model of the vehicle.

Of the members, such as the wheel 11 and the shock absorber 15, a portion closer to the wheel 11 than the suspension spring 16 is referred to as "an unsprung portion 70 or an unsprung member 70" (see FIG. 5). On the other hand, of the members, such as the vehicle body 10*a* and the shock absorber 15, a portion closer to the vehicle body 10*a* than the suspension spring 16 is referred to as "a sprung portion 71 or a sprung member 71" (see FIG. 5).

Further, each of a left front wheel active actuator 17*fl*, a right front wheel active actuator 17*fr*, a left rear wheel active actuator 17*r*1, and a right rear wheel active actuator 17*rr* is provided between the vehicle body 10*a* and each of the suspension arms 14*fl* to 14*rr*. The active actuators 17*fl* to 17*rr* are provided in parallel with respect to the shock absorbers 15*fl* to 15*rr* and the suspension springs 16*fl* to 16*rr*, respectively.

Hereinafter, each of the left front wheel active actuator 17*fl*, the right front wheel active actuator 17*fr*, the left rear wheel active actuator 17*r*1, and the right rear wheel active actuator 17*rr* will be referred to as an "active actuator 17" when it is not necessary to distinguish them from each other.

Further, the left front wheel active actuator 17*fl* and the right front wheel active actuator 17*fr* have the same configuration (specification), and each of them is referred to as a "front wheel active actuator 17*f*". The left rear wheel active actuator 17*r*1 and the right rear wheel active actuator 17*rr* have the same configuration (specification), and each of them may be referred to as a "rear wheel active actuator 17*r*". In this example, the front wheel active actuator 17*f* and the rear wheel active actuator 17*r* have different response performances. The front wheel active actuator 17*f* and the rear wheel active actuator 17*r* may have the same response performance.

The active actuator 17 generates a control force Fc based on a control command from an electronic control device 30 illustrated in FIG. 2. The control force Fc is a force in the vertical direction that acts between the vehicle body 10*a* and the wheels 11 (that is, between the sprung portion 71 and the unsprung portion 70) for damping vibration in the sprung portion 71. The electronic control device 30 is referred to as an ECU 30, and may be referred to as "a control unit or a controller". Further, the active actuator 17 may be referred to as a "control force generator". The active actuator 17 is an electromagnetic active actuator. The active actuator 17 cooperates with the shock absorber 15, the suspension spring 16, and the like, to form an active suspension.

As illustrated in FIG. 2, the vibration damping control apparatus 20 includes the above-described ECU 30 and a storage device 31.

The ECU 30 includes a microcomputer. The microcomputer includes a CPU 30a, a ROM 30b, a RAM 30c, an interface (I/F) 30d, and the like. The CPU 30a implements various functions by executing instructions (programs, routines) stored in the ROM 30b.

The ECU 30 is connected to the storage device 31. In this example, the storage device 31 is a non-volatile storage device capable of reading and writing information, such as a hard disk drive. The ECU 30 can store the information in the storage device 31 and read the information stored in the storage device 31. The storage device 31 is not limited to the hard disk drive, and may be a non-volatile storage device or storage medium capable of reading and writing information.

Figure 3:
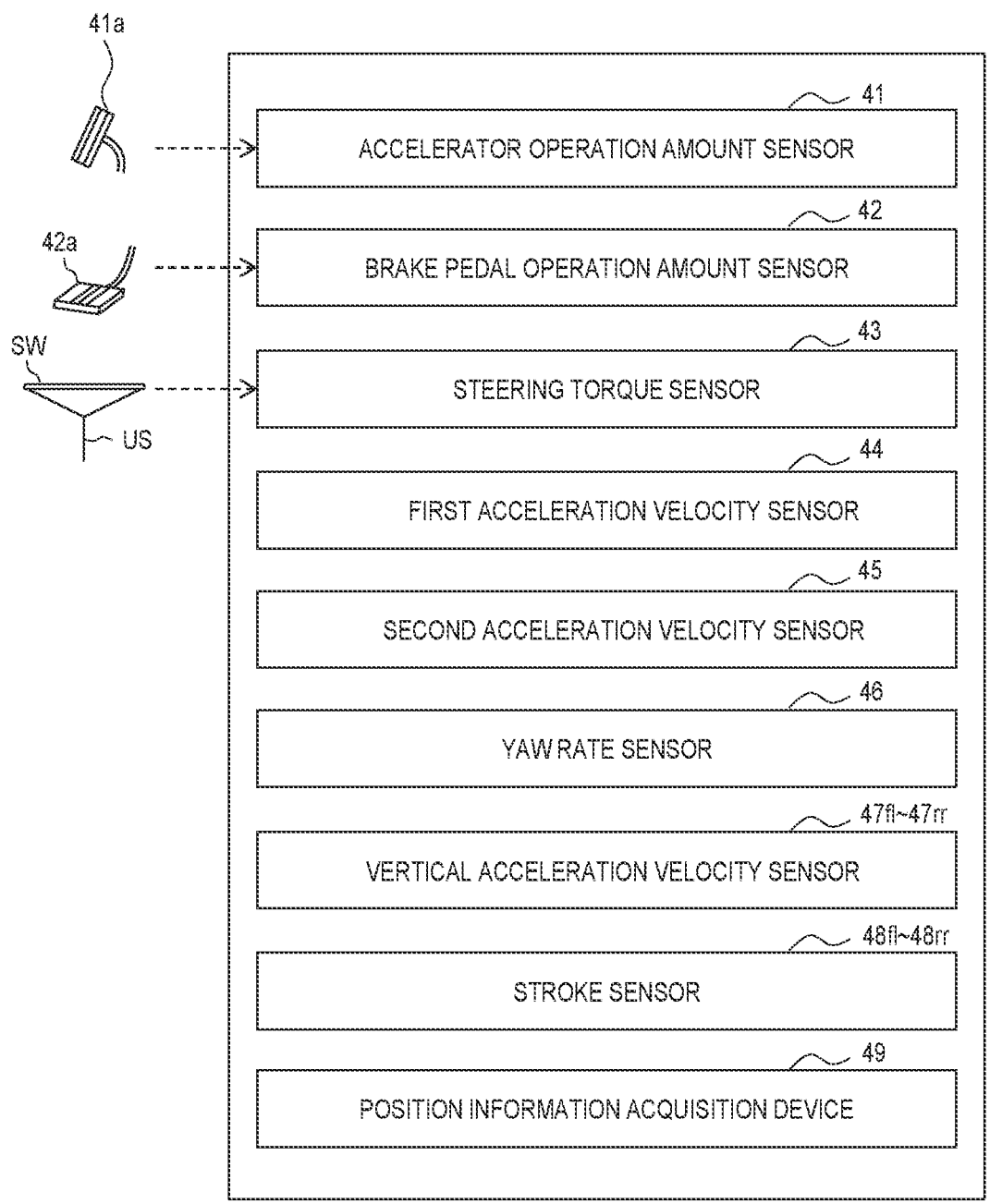
FIG. 3 is a diagram used for describing components of an information acquisition device of FIG. 2.

Further, the vibration damping control apparatus 20 includes an information acquisition device 40. The information acquisition device 40 includes sensors 41 to 48 and a position information acquisition device 49 as illustrated in FIG. 3. The ECU 30 is connected to the information acquisition device 40, and receives a detection signal or an output signal from the sensors 41 to 48 and the position information acquisition device 49.

An accelerator pedal operation amount sensor 41 detects an operation amount (an accelerator opening degree) of an accelerator pedal 41a of the vehicle 10 and outputs a signal indicating an accelerator pedal operation amount AP. A brake pedal operation amount sensor 42 detects an operation amount of a brake pedal 42a of the vehicle 10 and outputs a signal indicating a brake pedal operation amount BP. A steering torque sensor 43 detects a steering torque acting on a steering shaft US by an operation of steering wheel SW (a steering operation), and outputs a signal indicating a steering torque Tr. A value of the steering torque Tr becomes a positive value when the steering wheel SW is rotated from a predetermined base position (a neutral position) to a first direction (for example, to the left), and becomes a negative value when the steering wheel SW is rotated from the predetermined base position to a second direction (for example, to the right) opposite to the first direction.

Since information acquired by the sensors 41 to 43 is information on a driving operation amount of a driver, it is sometimes referred to as "operation amount information" hereafter.

A first acceleration sensor 44 detects a first acceleration ax, which is acceleration in the front-rear direction (a front-rear acceleration) of the vehicle 10, and outputs a signal indicating the first acceleration ax. A second acceleration sensor 45 detects a second acceleration ay, which is acceleration in the lateral direction (a lateral acceleration) of the vehicle 10, and outputs a signal indicating the second acceleration ay. A yaw rate sensor 46 detects a yaw rate Yr of the vehicle 10 and outputs a signal indicating the yaw rate Yr.

Vertical acceleration sensors 47fl to 47rr detect vertical accelerations (sprung accelerations $ddz_2fl$ to $ddz_2rr$) of the vehicle body 10a (the sprung portion 71) with respect to positions of the wheels 11fl to 11rr and output signals indicating the vertical accelerations, respectively. Each of the vertical acceleration sensors 47fl to 47rr is referred to as a "vertical acceleration sensor 47" when it is not necessary to distinguish them from each other. Similarly, each of the sprung accelerations $ddz_2fl$ to $ddz_2rr$ is referred to as a "sprung acceleration $ddz_2$".

Stroke sensors 48fl to 48rr are provided in the suspensions 13fl to 13rr, respectively. The stroke sensors 48fl to 48rr detect vertical strokes Hfl to Hrr of the suspensions 13fl to 13rr, respectively, and output signals indicating the vertical strokes. The strokes Hfl to Hrr are vertical strokes between the vehicle body 10a (the sprung portion 71) corresponding to the position of each wheel 11 illustrated in FIG. 1, and each of the wheel support members 12fl to 12rr (the unsprung portion 50). Each of the stroke sensors 48fl to 48rr is referred to as a "stroke sensors 48" when it is not necessary to distinguish them from each other. Similarly, each of the strokes Hfl to Hrr is referred to as a "stroke H".

A position information acquisition device 49 includes a Global Navigation Satellite System (GNSS) receiver and a map database. The GNSS receiver receives a signal (for example, a GNSS signal) for detecting a position of the vehicle 10 from an artificial satellite. The map database stores map information. The position information acquisition device 49 specifies a current position (for example, latitude and longitude) of the vehicle 10 based on the GNSS signal, and outputs a signal indicating a specified position. An example of the position information acquisition device 49 includes a part of a navigation device.

The GNSS signal includes information on a moving velocity of the vehicle 10 and information on an azimuth angle indicating the proceeding direction of the vehicle 10. Therefore, the position information acquisition device 49 outputs the current velocity Vs of the vehicle 10 and the azimuth angle θ indicating the proceeding direction of the vehicle 10. With respect to the azimuth angle θ, the north direction of the azimuth is defined as 0°. The degree of the azimuth angle θ increases clockwise. The east direction is 90°, the south direction is 180°, and the west direction is 270°.

The map database may include information on a three-dimensional map composed of a point group of feature points, such as road shapes and structures. In this case, the position information acquisition device 49 may detect a point group around the vehicle 10 by a LiDAR, a camera sensor (neither shown), and the like included in the vehicle 10, and specify the current position of the vehicle 10 based on information on the point group and the three-dimensional map (see, for example, Japanese Unexamined Patent Application Publication No. 2020-16541).

Since information acquired by the sensors 44 to 48 and the position information acquisition device 49 is information on a traveling state of the vehicle 10, it may be referred to as "traveling state information" hereafter.

With reference to FIG. 2, the vibration damping control apparatus 20 further includes a preview sensor 51 and a wireless communication device 52. The ECU 30 is connected to the preview sensor 51 and the wireless communication device 52.

Examples of the preview sensor 51 include one of a camera sensor, a LiDAR, and a radar sensor, or a combination thereof. The preview sensor 51 acquires a road surface displacement ($z_0$ to be described below) in front of the vehicle 10.

The wireless communication device 52 may be a wireless communication terminal used for communicating information with a cloud 60 (a data management device) via a network NW. The cloud 60 includes a server 61 and at least one storage device 62.

The server 61 includes a CPU, a ROM, a RAM, an interface (I/F), and the like. The server 61 searches and reads data stored in the storage device 62, and writes the data on the storage device 62. Further, the server 61 transmits the data (a part of a road surface information map to be described below) stored in the storage device 62 to the vehicle 10 via the network NW in response to a request from the vibration damping control apparatus 20 (the ECU 30).

Figure 4:
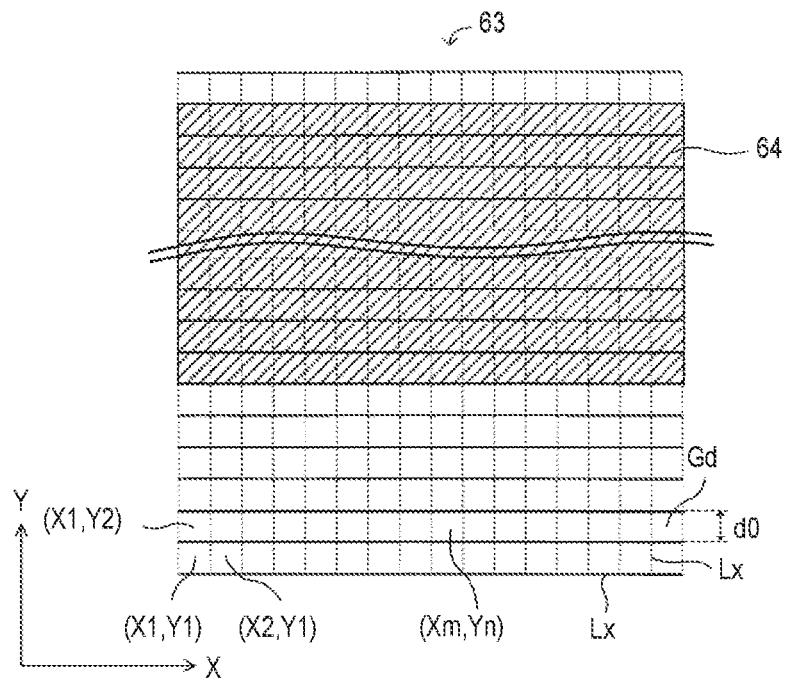
FIG. 4 is a diagram used for describing a road surface information map.

The storage device 62 stores the road surface information map 63 in a form of a look-up table. The road surface information map 63 has a storage area for each of a plurality of sections Gds illustrated in FIG. 4. The sections Gds are obtained by virtually dividing a road (a road surface) by a plurality of parallel lines Lx in the X direction and a plurality of parallel lines Ly in the Y direction. In this example, the sections Gds are squares having sizes equal to each other. A distance d0 of one side of the section Gd is a value of 50 mm or greater and 150 mm or less. In this example, the distance d0 is 100 mm. A shape of the section Gd is not limited to a square shape, and may be determined according to a size and shape of a ground contact area of a tire of the wheel 11.

In this example, the X direction is the north direction of the azimuth and the Y direction is perpendicular to the X direction. A position of the section Gd in the X direction and the Y direction is represented by Xm (m=1, 2, 3, ... ) and Yn (n=1, 2, 3, ... ). For example, a range of each of the sections Gds is defined by latitude data and longitude data. Therefore, when position information specified by a certain set of latitude and longitude is given, one section Gd(Xm, Yn) is specified from among the sections Gds.

Each section Gd of the road surface information map 63 stores a road surface displacement-associated value, which is a value associated with a displacement of the road surface in the vertical direction. The road surface displacement-associated value includes at least one of a road surface displacement $z_0$ representing the displacement of the road surface in the vertical direction, a road surface displacement velocity $dz_0$ representing a time differential value of the road surface displacement $z_0$, an unsprung displacement $z_1$ representing a displacement of the unsprung portion 70 in the vertical direction, and an unsprung velocity $dz_1$ representing a time differential value of the unsprung displacement $z_1$. In this example, the road surface displacement-associated value is the unsprung displacement $z_1$.

Therefore, as illustrated in FIG. 2, the road surface information map 63 is data in which position information 63a indicating the position of the road surface is associated with the unsprung displacement ($z_1$) 63b in the position information 63a.

Returning to FIG. 2, the vibration damping control apparatus 20 further includes the active actuators 17 (17fl to 17rr). The ECU 30 is connected to the active actuator 17 via a drive circuit (not shown).

The ECU 30 calculates a target control force Fct for the active actuator 17. The target control force Fct is a control force for the preview vibration damping control, that is, a control force for damping vibration in the sprung portion 71 of the wheel 11. The ECU 30 controls the active actuator 17 such that the active actuator 17 generates a control force Fc corresponding to (matching) the target control force Fct at a time point at which the wheel 11 passes through a predicted passage position to be described below.

Overview of Basic Preview Vibration Damping Control

Hereinafter, an overview of a basic preview vibration damping control executed by the vibration damping control apparatus 20 will be described. FIG. 5 illustrates a single-wheel model of the vehicle 10 on a road surface 75.

The spring 72 corresponds to the suspension spring 16, a damper 73 corresponds to the shock absorber 15, and an actuator 74 corresponds to the active actuator 17.

In FIG. 5, the mass of the sprung portion 71 is written as a sprung mass $m_2$. A displacement of the unsprung portion 70 (an unsprung displacement) in the vertical direction is represented by $z_1$, as described above. A displacement of the sprung portion 71 (a sprung displacement) in the vertical direction is presented by $z_2$. The sprung displacement $z_2$ is a displacement of the sprung portion 71 in the vertical direction corresponding to a position of each wheel 11. A spring constant (an equivalent spring constant) of the spring 72 is written as a spring constant K. A damping coefficient (an equivalent damping coefficient) of the damper 73 is written as a damping coefficient C. A force generated by the actuator 74 is written as a control force Fc.

Further, time differential values of $z_1$ and $z_2$ are written as $dz_1$ and $dz_2$, respectively, and second time differential values of $z_1$ and $z_2$ are written as $ddz_1$ and $ddz_2$, respectively. Hereinbelow, for $z_1$ and $z_2$, an upward displacement is defined to be positive, and for forces generated by the spring 72, the damper 73, the actuator 74, and the like, the upward displacement is defined to be positive.

In the single-wheel model of the vehicle 10 illustrated in FIG. 5, an equation of motion for the motion of the sprung portion 71 in the vertical direction can be expressed by an equation (1):

$$m_2 ddz_2 = C(dz_1 - dz_2) + K(z_1 - z_2) - Fc \tag{1}$$

It is assumed that the damping coefficient C in the equation (1) is constant. However, since an actual damping coefficient changes according to a stroke velocity of the suspension 13, the damping coefficient C may be set to, for example, a value that changes according to a time differential value of the stroke H.

Further, when vibration in the sprung portion 71 is completely canceled by the control force Fc (that is, when the sprung acceleration $ddz_2$, a sprung velocity $dz_2$, and the sprung displacement $z_2$ are zero, respectively), the control force Fc is expressed by an equation (2):

$$Fc = Cdz_1 + Kz_1 \tag{2}$$

Therefore, the control force Fc for damping vibration in the sprung portion 71 can be expressed by an equation (3) with a control gain as α. The control gain α is any constant greater than 0 and equal to or less than 1.

$$Fc = \alpha(Cdz_1 + Kz_1) \tag{3}$$

When the equation (3) is applied to the equation (1), the equation (1) can be expressed by the following equation (4):

$$m_2 ddz_2 = C(dz_1 - dz_2) + K(z_1 - z_2) - \alpha(Cdz_1 + Kz_1) \tag{4}$$

By Laplace transforming the equation (4) and rearranging it, the following equation (5) is obtained. In other words, a transfer function from the unsprung displacement $z_1$ to the sprung displacement $z_2$ is expressed by the equation (5). In the equation (5), "s" is a Laplace operator.

$$\frac{z_2}{z_1} = \frac{(1-\alpha)(Cs+K)}{m_2 S^2 + Cs + K} \tag{5}$$

According to the equation (5), the transfer function changes according to a. When a is any value greater than 0 and equal to or less than 1, it is confirmed that the magnitude of the transfer function is definitely smaller than 1 (that is, vibration in the sprung portion 71 can be reduced). Alternatively, when a is 1, the magnitude of the transfer function is 0, such that it is confirmed that vibration in the sprung portion 71 is completely canceled. Based on the equation (3), the target control force Fct is calculated according to the following equation (6). The target control force Fct is a target control force for reducing vibration at a time at which the wheel 11 passes through the predicted passage position, and can also be referred to as a "target control force for a feedforward control". Here, the predicted passage position is a position through which the wheel 11 passes "at a time point after a look-ahead time (future) to be described below elapsed from the current time point". A gain $\beta_1$ in an equation (6) corresponds to $\alpha C$ and a gain $\beta_2$ corresponds to $\alpha K$.

$$Fct = \beta_1 \times dz_1 + \beta_2 \times z_1 \qquad (6)$$

As such, the ECU 30 acquires in advance (looks ahead) the unsprung displacement $z_1$ at the predicted passage position. Then, the ECU 30 calculates the target control force Fct by applying the acquired unsprung displacement $z_1$ to the equation (6).

At a timing at which the wheel 11 passes through the predicted passage position (that is, at a timing at which the unsprung displacement $z_1$ applied to the equation (6) occurs), the ECU 30 causes the actuator 74 to generate the control force Fc corresponding to the target control force Fct. As such, when the wheel 11 passes through the predicted passage position (that is, when the unsprung displacement $z_1$ applied to the equation (6) occurs), vibration in the sprung portion 71 can be reduced.

The ECU 30 may calculate the target control force Fct based on the following equation (7) in which a differential term ($\beta_1 \times dz_1$) is omitted from the equation (6). In this case, the ECU 30 can also cause the actuator 74 to generate a control force Fc for reducing vibration in the sprung portion 71. Therefore, vibration in the sprung portion 71 can be reduced as compared with a case where the control force Fc is not generated.

$$Fct = \beta_2 \times z_1 \qquad (7)$$

The vibration damping control at the sprung portion 71 as above is referred to as the "preview vibration damping control".

In the above-described single-wheel model, the mass of the unsprung portion 70 and the elastic deformation of the tire are ignored, and the road surface displacement $z_0$ indicating the displacement of the road surface 75 in the vertical direction and the unsprung displacement $z_1$ are assumed to be the same. In another example, a similar preview vibration damping control may be executed by using the road surface displacement $z_0$ and/or the road surface displacement velocity $dz_0$ instead of or in addition to the unsprung displacement $z_1$ and the unsprung velocity $dz_1$.

Preview Vibration Damping Control of Front and Rear Wheels

Next, with reference to FIGS. 6 to 8, the preview vibration damping control of the front and the rear wheels will be described in detail.

Preview Vibration Damping Control of Front Wheel

Figure 6:
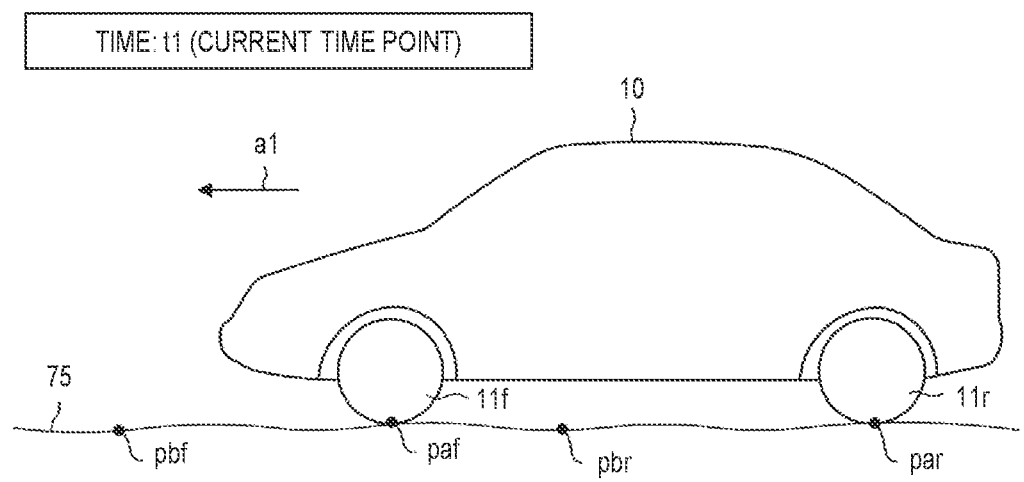
FIG. 6 is a diagram used for describing a preview vibration damping control.

FIG. 6 illustrates the vehicle 10 traveling in a direction represented by an arrow al at current time point t1. At current time point t1, the position of the front wheel 11f (a ground contact point) is paf. The ECU 30 determines a front wheel look-ahead time tpf. The front wheel look-ahead time tpf is a time difference between current time point t1 and a future time point, which is for predicting a predicted passage position pbf of the front wheel 11f. In this example, the front wheel look-ahead time tpf is a time equal to or less than a predetermined time (1 second in this example).

Then, the ECU 30 specifies the predicted passage position pbf of the front wheel 11f. The predicted passage position pbf of the front wheel 11f is a position through which the front wheel 11f is predicted to pass at a time point (future) at which the front wheel look-ahead time tpf has elapsed since current time point t1. The ECU 30 calculates the predicted passage position pbf as described below.

The ECU 30 acquires in advance, from the cloud 60, "a part (a shaded part 64 illustrated in FIG. 4) of the road surface information map 63" corresponding to an area in the vicinity of the current position of the vehicle 10 (a preparation segment to be described below). Hereinafter, the part of the road surface information map 63 acquired in this manner will be referred to as "road surface information 64". The ECU 30 acquires the unsprung displacement ($z_1$) 63b at the predicted passage position pbf based on the road surface information 64 (a part of data of the road surface information map 63) and the predicted passage position pbf.

The ECU 30 calculates a target control force Fctf by applying the unsprung displacement ($z_1$) 63b at the predicted passage position pbf to the unsprung displacement $z_1$ of the following equation (8). 132f is a gain for the front wheel 11f.

$$Fctf = \beta_{2f} \times z_1 \qquad (8)$$

The ECU 30 transmits a control command including the target control force Fctf to the front wheel active actuator 17f such that the front wheel active actuator 17f generates a control force Fcf corresponding to (matching) the target control force Fctf.

Figure 7:
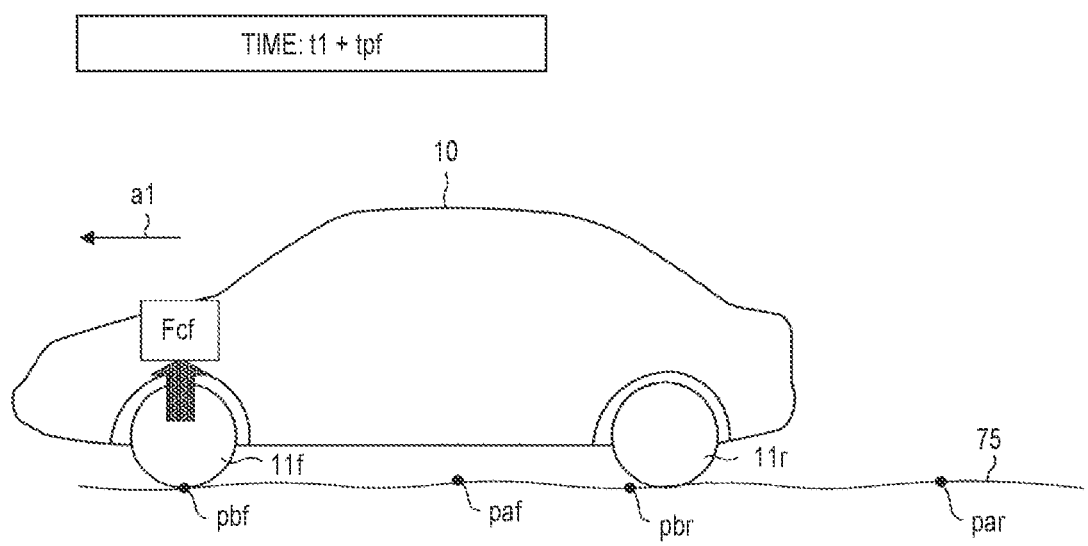
FIG. 7 is another diagram used for describing the preview vibration damping control.

As illustrated in FIG. 7, the front wheel active actuator 17f generates the control force Fcf corresponding to the target control force Fctf at a time point after the front wheel look-ahead time tpf elapsed from current time point t1 (that is, a timing at which the front wheel 11f actually passes through the predicted passage position pbf). Therefore, the front wheel active actuator 17f can generate, at an appropriate timing, the control force Fcf for reducing vibration in the sprung portion 71 caused by the unsprung displacement $z_1$ of the predicted passage position pbf.

Preview Vibration Damping Control of Rear Wheel

As illustrated in FIG. 6, at current time point t1, the position of the rear wheel 11r (a ground contact point) is par. The ECU 30 determines a rear wheel look-ahead time tpr. The rear wheel look-ahead time tpr is a time difference between current time point t1 and a future time point, which is for predicting a predicted passage position pbr of the rear wheel 11r. In this example, the rear wheel look-ahead time tpr is a time equal to or less than a predetermined time (1 second in this example). As described below, the front wheel look-ahead time tpf may differ from the rear wheel look-ahead time tpr.

Then, the ECU 30 specifies the predicted passage position pbr of the rear wheel 11r. The predicted passage position pbr is a position through which the rear wheel 11r is predicted to pass at a time point (future) at which the rear wheel look-ahead time tpr has elapsed since current time point t1. The ECU 30 acquires the unsprung displacement ($z_1$) 63b at the predicted passage position pbr based on the road information 64 and the predicted passage position pbr.

The ECU 30 calculates a target control force Fctr by applying the unsprung displacement ($z_1$) 63b at the predicted passage position pbr to the unsprung displacement $z_1$ of the following equation (9). $\beta_{2r}$ is a gain for the rear wheel 11r. The gain $\beta_{2f}$ in the equation (8) and the gain $\beta_{2r}$ in equation (9) are set to values different from each other. This is because a spring constant Kf of the left front wheel suspension 13fl and the right front wheel suspension 13fr differs from a spring constant Kr of the left rear wheel suspension 13rl and the right rear wheel suspension 13rr.

$$Fctr = \beta_{2r} \times z_1 \qquad (9)$$

The ECU 30 transmits a control command including the target control force Fctr to the rear wheel active actuator 17*r* such that the rear wheel active actuator 17*r* generates a control force Fcr corresponding to (matching) the target control force Fctr.

Figure 8:
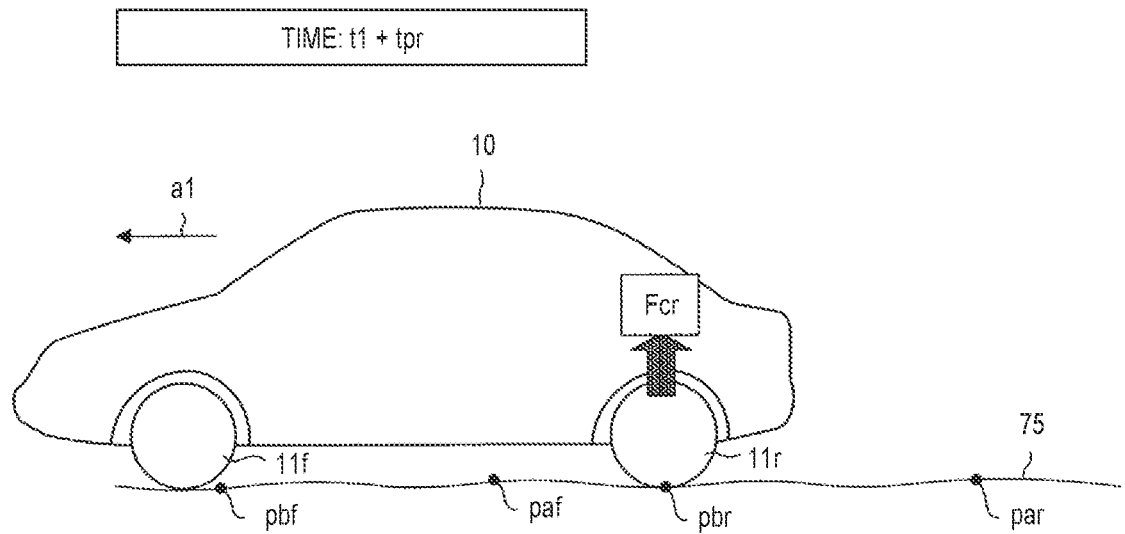
FIG. 8 is still another diagram used for describing the preview vibration damping control.

As illustrated in FIG. 8, the rear wheel active actuator 17*r* generates the control force Fcr corresponding to the target control force Fctr at a time point after the rear wheel look-ahead time tpr elapsed from current time point t1 (that is, a timing at which the rear wheel 11*r* actually passes through the predicted passage position pbr). Therefore, the rear wheel active actuator 17*r* can generate, at an appropriate timing, the control force Fcr for reducing vibration in the sprung portion 71 caused by the unsprung displacement $z_1$ of the predicted passage position pbr.

Overview of Operation

Hereinafter, the wheel 11 which is a target of the preview vibration damping control will be written as a "wheel 11*i*". The subscript "i" represents any one of "fl, fr, rl, and rr". The same applies to the subscript "i" attached to other components.

As described above, in the preview vibration damping control, it is necessary to predict, with high accuracy, the position through which the wheel 11*i* passes (that is, the predicted passage position pbf of the front wheel and the predicted passage position pbr of the rear wheel). In particular, in the road surface information map 63 used for the preview vibration damping control, a road surface displacement-associated value (the unsprung displacement $z_1$) is stored for each small section Gd (a square with a side of 100 mm). Therefore, the vibration damping control apparatus 20 is required to predict, with high accuracy, which section Gd the wheel 11*i* passes through. However, since the behavior of the vehicle 10 (the velocity Vs, the proceeding direction, and the like) is changed every moment, it is not easy to correctly predict the position through which the wheel 11*i* passes.

By considering the above, the ECU 30 calculates the predicted passage position pbi of the wheel 11*i* by using the current position pai of the wheel 11*i*, the velocity Vs of the vehicle 10, and the proceeding direction of the vehicle 10 (the azimuth angle θ in this example).

Specification of Current Position of Wheel

First, the ECU 30 specifies the current position pai of the wheel 11*i* as described below. Specifically, the ECU 30 acquires the operation amount information and the traveling state information from the information acquisition device 40. The ECU 30 acquires the current position of the vehicle 10 and the azimuth angle θ of the vehicle 10 from the traveling state information. The ROM 30*b* of the ECU 30 stores in advance positional relationship data indicating the relationship between a mounting position of the GNSS receiver in the vehicle 10 and the position of each wheel 11. The current position of the vehicle 10 acquired from the position information acquisition device 49 corresponds to the mounting position of the GNSS receiver. Therefore, the ECU 30 specifies the current position pai of the wheel 11*i* based on the current position of the vehicle 10, the azimuth angle θ of the vehicle 10, and the positional relationship data.

Determination of Look-ahead Time

Next, the ECU 30 calculates a look-ahead time tpi of the wheel 11*i* according to the following equation (10). ta1 is a calculation delay time to be described below and ta2 is a response delay time to be described below.

$$tpi = ta1 + ta2 \quad (10)$$

As such, the look-ahead time tpi is based on the calculation delay time ta1 and the response delay time ta2. The calculation delay time ta1 is a time from the current time point to the time at which the ECU 30 transmits a control command including a target control force Fcti to an active actuator 17*i*. The response delay time ta2 is a time from the time at which the ECU 30 transmits the control command to the active actuator 17*i* to a time at which the active actuator 17*i* actually generates a control force Fci corresponding to the target control force Fcti.

It is considered that the calculation delay time ta1 becomes longer as the number of processes, tasks, and the like executed by the CPU 30*a* at the current time point is greater. For example, the ECU 30 determines the calculation delay time ta1 according to a usage rate of the CPU 30*a* at the current time point. The ECU 30 determines the calculation delay time ta1 such that the calculation delay time ta1 becomes longer as the usage rate of the CPU 30*a* at the current time point is greater.

Next, the ECU 30 determines the response delay time ta2 according to the magnitude of the amplitude of the road surface. For example, when the amplitude of the road surface is small, the magnitude (the absolute value) of the control force Fci is small. Therefore, a time until the active actuator 17*i* actually generates the control force Fci is shortened. On the other hand, when the amplitude of the road surface is large, the magnitude of the control force Fci is large. In this case, a time until the active actuator 17*i* actually generates the control force Fci is lengthened. Therefore, the ECU 30 determines the response delay time ta2 by using, for example, the road surface information 64 (the part of the road surface information map 63) as below.

Figure 9:
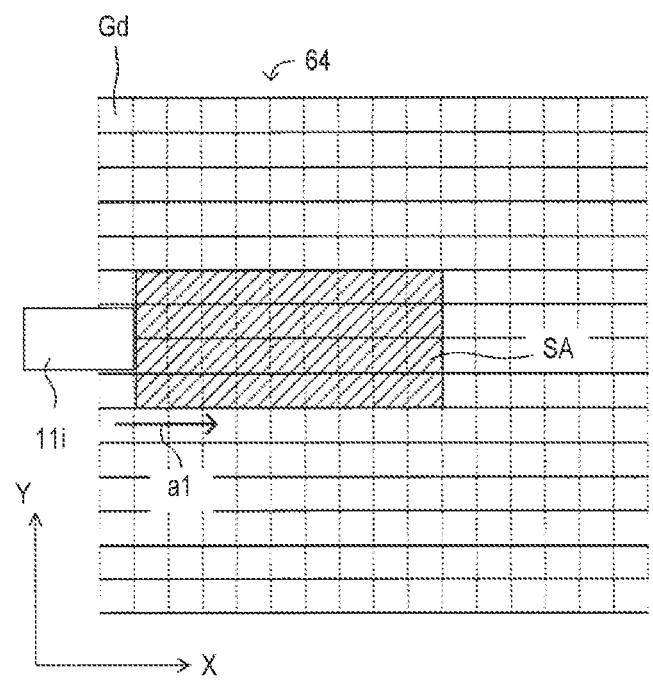
FIG. 9 is a diagram used for describing a process for calculating a response delay time.

In an example illustrated in FIG. 9, the wheel 11*i* is moving in the direction of al. The ECU 30 determines a sampling area SA (a shaded part in FIG. 9). For example, the sampling area SA may be an area in front of the wheel 11*i* and an area through which the wheel 11*i* may pass during a time period from the current time point to a time point at which the look-ahead time tpi (≤1 s) has elapsed. The ECU 30 acquires the unsprung displacements ($z_1$) 63*b* included in the sampling area SA from the road surface information 64. The ECU 30 specifies the maximum value $z_{1\_max}$ and the minimum value $z_{1\_min}$ from among the acquired unsprung displacements ($z_1$) 63*b*, and determines the absolute value of the difference between the maximum value and the minimum value as an amplitude index value Va (that is, Va=|$z_{1\_max} - z_{1\_min}$|). The ECU 30 determines the response delay time ta2 such that the response delay time ta2 becomes longer as the amplitude index value Va is greater. The ECU 30 may calculate the amplitude index value Va according to the magnitude of the amplitude of the road surface or another method capable of calculating the value associated with the magnitude.

Figure 10:
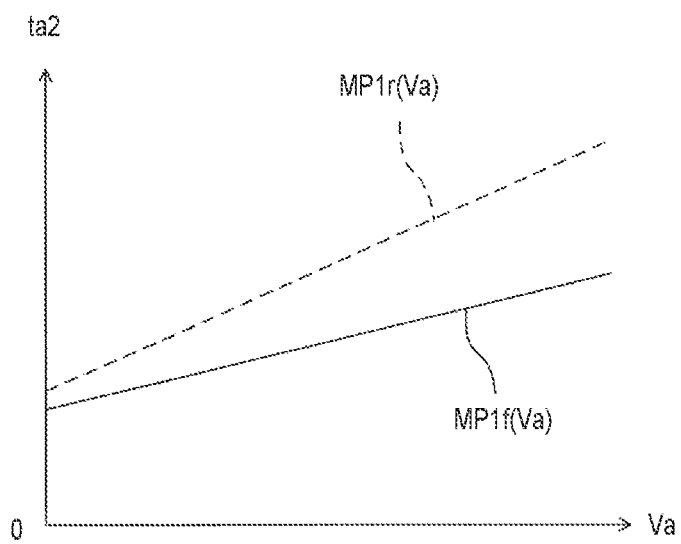
FIG. 10 is a graph illustrating two maps which define a relationship between an amplitude index value and the response delay time.

When the wheel 11*i* is the front wheel 11*f*, the ECU 30 determines the response delay time ta2 by applying the amplitude index value Va to a map MP1*f*(Va) illustrated in FIG. 10. When the wheel 11*i* is the rear wheel 11*r*, the ECU 30 determines the response delay time ta2 by applying the amplitude index value Va to a map MP1*r*(Va) illustrated in FIG. 10. In each of the map MP1*f*(Va) and the map MP1*r*(Va), the relationship between the amplitude index value Va and the response delay time ta2 is defined such that the response delay time ta2 becomes longer as the amplitude index value Va is greater.

In this example, the response performance of the front wheel active actuator 17*f* is higher than the response performance of the rear wheel active actuator 17*r*. Therefore, the response delay time ta2 when the wheel 11$i$ is the front wheel 11$f$ is smaller than the response delay time ta2 when the wheel 11$i$ is the rear wheel 11$r$. Further, an increase amount of the response delay time ta2 per constant increase amount of the amplitude index value Va in the map MP1$f$(Va) is smaller than an increase amount of the response delay time ta2 per constant increase amount of the amplitude index value Va in the map MP1$r$(Va).

Determination of Predicted Passage Position

Figure 11:
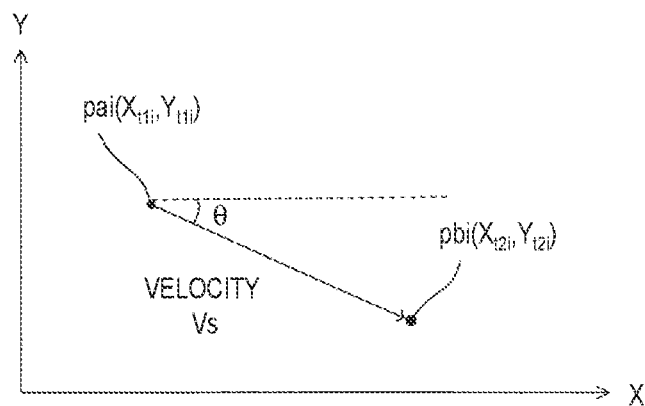
FIG. 11 is a graph used for describing a process for calculating a predicted passage position.

Next, the ECU 30 determines the predicted passage position pbi of the wheel 11$i$ by calculation as described below. As illustrated in FIG. 11, the current position pai of the wheel 11$i$ is expressed by ($X_{t1i}$, $Y_{t1i}$) and the predicted passage position pbi of the wheel 11$i$ is expressed by ($X_{t2i}$, $Y_{t2i}$).

The ECU 30 calculates the predicted passage position pbi according to an equation corresponding to the wheel 11$i$ from among the following equations (11) to (18). Hereinafter, the "information on the vehicle 10 and the wheel 11$i$" used for calculating the predicted passage position pbi will be referred to as "specific vehicle information". In this example, the specific vehicle information includes the current position pai of the wheel 11$i$, the velocity Vs, and the azimuth angle θ. In the equations (11) to (18), $l_f$ is a distance between the center of gravity of the sprung portion and the axle of the front wheel in the front-rear direction of the vehicle 10, and $l_r$ is a distance between the center of gravity of the sprung portion and the axle of the rear wheel in the front-rear direction of the vehicle 10. $T_f$ is a front tread and $T_r$ is a rear tread. Hereinafter, a calculation method of the predicted passage position pbi according to the equations (11) to (18) will be referred to as a "first calculation method".

When the wheel 11$i$ is the left front wheel 11$fl$, the ECU 30 calculates a predicted passage position pbfl($X_{t2fl}$, $Y_{t2fl}$) of the left front wheel 11$fl$ by applying the specific vehicle information (a current position pafl of the left front wheel 11$fl$, velocity Vs, an azimuth angle θ) and a look-ahead time tpfl to the equations (11) and (12).

$$x_{t2fl} = x_{t1fl} + Vs \cdot tpfl \cdot \cos\theta + l_f \cos(\theta) + \frac{T_f}{2}\cos\left(\theta - \frac{\pi}{2}\right) \quad (11)$$

$$y_{t2fl} = y_{t1fl} + Vs \cdot tpfl \cdot \sin\theta + l_f \sin(\theta) + \frac{T_f}{2}\sin\left(\theta - \frac{\pi}{2}\right) \quad (12)$$

When the wheel 11$i$ is the right front wheel 11$fr$, the ECU 30 calculates a predicted passage position pbfr($X_{t2fr}$, $Y_{t2fr}$) of the right front wheel 11$fr$ by applying the specific vehicle information (a current position pafr of the right front wheel 11$fr$, velocity Vs, an azimuth angle θ) and a look-ahead time tpfr to the equations (13) and (14).

$$x_{t2fr} = x_{t1fr} + Vs \cdot tpfr \cdot \cos\theta + l_f \cos(\theta) + \frac{T_f}{2}\cos\left(\theta + \frac{\pi}{2}\right) \quad (13)$$

$$y_{t2fr} = y_{t1fr} + Vs \cdot tpfr \cdot \sin\theta + l_f \sin(\theta) + \frac{T_f}{2}\sin\left(\theta + \frac{\pi}{2}\right) \quad (14)$$

When the wheel 11$i$ is the left rear wheel 11$rl$, the ECU 30 calculates a predicted passage position pbrl($X_{t2rl}$, $Y_{t2rl}$) of the left rear wheel 11$rl$ by applying the specific vehicle information (a current position parl of the left rear wheel 11$rl$, velocity Vs, an azimuth angle θ) and a look-ahead time tprl to the equations (15) and (16).

$$x_{t2rl} = x_{t1rl} + Vs \cdot tprl \cdot \cos\theta - l_r \cos(\theta) + \frac{T_r}{2}\cos\left(\theta - \frac{\pi}{2}\right) \quad (15)$$

$$y_{t2rl} = y_{t1rl} + Vs \cdot tprl \cdot \sin\theta - l_r \sin(\theta) + \frac{T_r}{2}\sin\left(\theta - \frac{\pi}{2}\right) \quad (16)$$

When the wheel 11$i$ is the right rear wheel 11$rr$, the ECU 30 calculates a predicted passage position pbrr($X_{t2rr}$, $Y_{t2rr}$) of the right rear wheel 11$rr$ by applying the specific vehicle information (a current position parr of the right rear wheel 11$rr$, velocity Vs, an azimuth angle θ) and a look-ahead time tprr to the equations (17) and (18).

$$x_{t2rr} = x_{t1rr} + Vs \cdot tprr \cdot \cos\theta - l_r \cos(\theta) + \frac{T_r}{2}\cos\left(\theta + \frac{\pi}{2}\right) \quad (17)$$

$$y_{t2rr} = y_{t1rr} + Vs \cdot tprr \cdot \sin\theta - l_r \sin(\theta) + \frac{T_r}{2}\sin\left(\theta + \frac{\pi}{2}\right) \quad (18)$$

Next, the ECU 30 acquires the unsprung displacement ($z_1$) 63$b$ at the predicted passage position pbi based on the road surface information 64 and the predicted passage position pbi obtained as described above. The ECU 30 calculates the target control force Fcti according to an equation corresponding to the wheel 11$i$ from among the equations (8) and (9) by using the unsprung displacement ($z_1$) 63$b$ at the predicted passage position pbi. Then, the ECU 30 transmits the control command including the target control force Fcti to the active actuator 17$i$.

During the traveling of the vehicle 10, the position and behavior of the vehicle 10 (the velocity Vs and the proceeding direction) are changed every moment. With the above configuration, the ECU 30 can calculate, with high accuracy, the predicted passage position pbi by using the current position pai of the wheel 11$i$, the velocity Vs, and the azimuth angle θ. Since the ECU 30 acquires, from the road surface information 64, the unsprung displacement ($z_1$) 63$b$ based on the highly accurate predicted passage position pbi, the acquired unsprung displacement ($z_1$) 63$b$ matches the unsprung displacement $z_1$ that actually occurs in the vehicle 10. The ECU 30 can execute the preview vibration damping control to reduce vibration in the sprung portion 71.

Vibration Damping Control Routine

The CPU 30$a$ of the ECU 30 (hereinafter, simply written as a "CPU") executes a vibration damping control routine illustrated in a flowchart in FIG. 12 every time a predetermined time elapses. The CPU executes the vibration damping control routine to each of the wheels 11. In other words, the wheel 11 as a target to which the vibration damping control routine is executed is written as the "wheel 11$i$" in the same manner as described above.

The CPU acquires in advance, from the cloud 60, a part (that is, the road surface information 64) of the road surface information map 63 corresponding to the preparation segment by executing a routine (not shown) every time the predetermined time elapses. The CPU temporarily stores the acquired road surface information 64 in the RAM 30$c$. The preparation segment is a segment of the road in front of the vehicle 10, and a segment of the road through which the vehicle 10 is predicted to pass. The preparation segment is a segment large enough to include the predicted passage position pbi.

Figure 12:
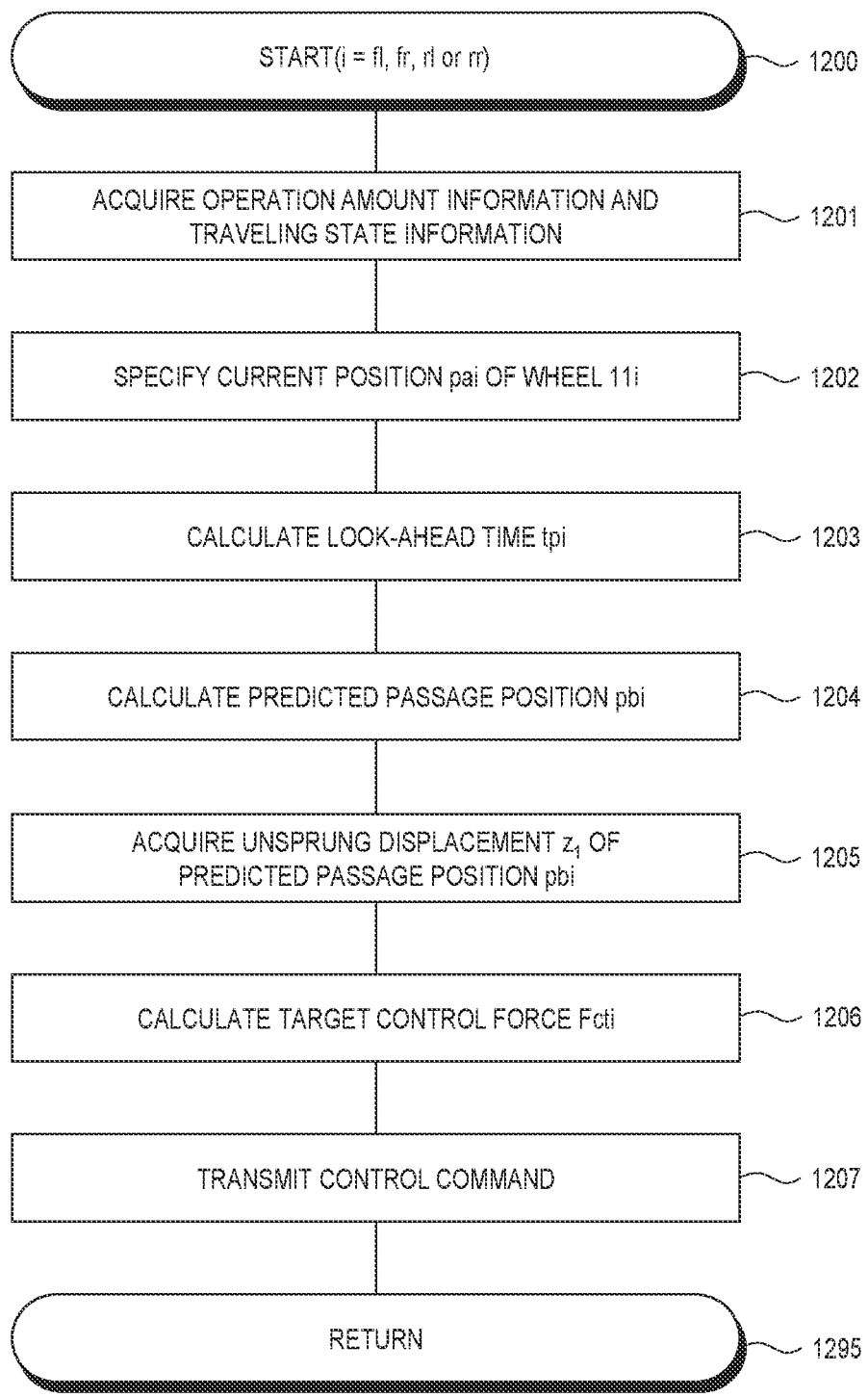
FIG. 12 is a flowchart illustrating a "vibration damping control routine" executed by a CPU of an electronic control device according to the first embodiment.

At a predetermined timing, the CPU starts processes from step 1200 of FIG. 12, executes the processes of steps 1201 to 1207 in order, and then proceeds to step 1295 and temporarily ends this routine.

Step 1201: The CPU acquires the operation amount information and the traveling state information from the information acquisition device 40. Step 1202: The CPU specifies the current position pai of the wheel 11i as described above.

Step 1203: As described above, the CPU calculates the look-ahead time tpi for the wheel 11i according to the equation (10). Step 1204: The CPU calculates the predicted passage position pbi according to the first calculation method.

Step 1205: The CPU acquires the unsprung displacement ($z_1$) 63b at the predicted passage position pbi, which is calculated in step 1204, from the road surface information 64 stored in the RAM 30c. Step 1206: The CPU calculates the target control force Fcti by using the unsprung displacement $z_1$ acquired in step 1205 as described above. Step 1207: The CPU transmits the control command including the target control force Fcti to the active actuator 17i corresponding to the wheel 11i.

With the above configuration, the vibration damping control apparatus 20 can calculate, with high accuracy, the predicted passage position pbi according to a simple method by using three pieces of information (the current position pai of the wheel 11i, the velocity Vs of the vehicle 10 and the azimuth angle θ of the vehicle 10) as the specific vehicle information. Since only three pieces of information, that is, the current position pai of the wheel 11i, the velocity Vs, and the azimuth angle θ, are used as the specific vehicle information, a calculation load when the vibration damping control apparatus 20 calculates the predicted passage position pbi is also small. Since the vibration damping control apparatus 20 acquires, from the road surface information 64, the unsprung displacement ($z_1$) 63b based on the highly accurate predicted passage position pbi, the acquired unsprung displacement ($z_1$) 63b matches the unsprung displacement $z_1$ that actually occurs in the vehicle 10. The vibration damping control apparatus 20 can execute the preview vibration damping control to reduce vibration in the sprung portion 71.

First Modified Example of First Apparatus

In step 1204, the CPU may calculate the predicted passage position pbi without using the equations (11) to (18). For example, the CPU calculates a velocity vector indicating the magnitude of the velocity Vs and the proceeding direction from the velocity Vs and the azimuth angle θ. Alternatively, the CPU may calculate, as the predicted passage position pbi, a position proceeded by "Vs×tpi" in the direction of the velocity vector from the current position pai of the wheel 11i.

In another example, a position prediction model that predicts the predicted passage position pbi from a relationship between the current position pai of the wheel 11i, the velocity Vs, and the azimuth angle θ may be used. The position prediction model can include a predetermined model, which is created based on motion characteristics of the vehicle 10. For example, as a position prediction model, a model created by a method (see, for example, Japanese Unexamined Patent Application Publication No. 2019-182093) may be used. The position prediction model may be created by machine learning. Alternatively, the CPU may obtain the predicted passage position pbi by inputting, into the position prediction model, the current position pai of the wheel 11i, the velocity Vs, and the azimuth angle θ.

Second Modified Example of First Apparatus

In step 1204, the CPU may calculate the predicted passage position pbi by further using another piece of information as the specific vehicle information. The CPU may calculate the predicted passage position pbi according to an equation, in which at least one of the first acceleration ax, the second acceleration ay, the yaw rate Yr, and a vehicle body slip angle β is added as a parameter, to the equations (11) to (18) of the first calculation method.

For example, the CPU may calculate the predicted passage position pbi according to the following equations (19) to (26). A calculation method of the predicted passage position pbi according to the equations (19) to (26) is a method in which the first acceleration ax and the second acceleration ay are added to the specific vehicle information, and will be referred to as a "second calculation method" hereinafter. The CPU calculates the predicted passage position pbi by applying the specific vehicle information (the current position pai of the wheel 11i, the velocity Vs, the azimuth angle θ, the first acceleration ax, and the second acceleration ay) and the look-ahead time tpi to the equation corresponding to the wheel 11i from among the equations (19) to (26). With the second calculation method, the CPU can calculate the predicted passage position pbi by further considering the first acceleration ax and the second acceleration ay. The CPU can calculate the predicted passage position pbi with higher accuracy than the first calculation method.

$$x_{t2fl} = x_{t1fl} + Vs \cdot tpfl \cdot \cos\theta + \frac{tpfl^2}{2}(a_x\cos\theta - a_y\sin\theta) + l_f\cos(\theta) + \frac{T_f}{2}\cos\left(\theta - \frac{\pi}{2}\right) \quad (19)$$

$$y_{t2fl} = y_{t1fl} + Vs \cdot tpfl \cdot \sin\theta + \frac{tpfl^2}{2}(a_x\sin\theta + a_y\cos\theta) + l_f\sin(\theta) + \frac{T_f}{2}\sin\left(\theta - \frac{\pi}{2}\right) \quad (20)$$

$$x_{t2fr} = x_{t1fr} + Vs \cdot tpfr \cdot \cos\theta + \frac{tpfr^2}{2}(a_x\cos\theta - a_y\sin\theta) + l_f\cos(\theta) + \frac{T_f}{2}\cos\left(\theta + \frac{\pi}{2}\right) \quad (21)$$

$$y_{t2fr} = y_{t1fr} + Vs \cdot tpfr \cdot \sin\theta + \frac{tpfr^2}{2}(a_x\sin\theta + a_y\cos\theta) + l_f\sin(\theta) + \frac{T_f}{2}\sin\left(\theta + \frac{\pi}{2}\right) \quad (22)$$

$$x_{t2rl} = x_{t1rl} + Vs \cdot tprl \cdot \cos\theta + \frac{tprl^2}{2}(a_x\cos\theta - a_y\sin\theta) - l_r\cos(\theta) + \frac{T_r}{2}\cos\left(\theta - \frac{\pi}{2}\right) \quad (23)$$

$$y_{t2rl} = y_{t1rl} + Vs \cdot tprl \cdot \sin\theta + \frac{tprl^2}{2}(a_x\sin\theta + a_y\cos\theta) - l_r\sin(\theta) + \frac{T_r}{2}\sin\left(\theta - \frac{\pi}{2}\right) \quad (24)$$

$$x_{t2rr} = x_{t1rr} + Vs \cdot tprr \cdot \cos\theta + \frac{tprr^2}{2}(a_x\cos\theta - a_y\sin\theta) - l_r\cos(\theta) + \frac{T_r}{2}\cos\left(\theta + \frac{\pi}{2}\right) \quad (25)$$

$$y_{t2rr} = y_{t1rr} + Vs \cdot tprr \cdot \sin\theta + \frac{tprr^2}{2}(a_x\sin\theta + a_y\cos\theta) - l_r\sin(\theta) + \frac{T_r}{2}\sin\left(\theta + \frac{\pi}{2}\right) \quad (26)$$

The CPU may calculate the predicted passage position pbi according to the following equations (27) to (34). A calculation method of the predicted passage position pbi according to the equations (27) to (34) is a method in which the yaw rate Yr is added to the specific vehicle information, and will be referred to as a "third calculation method" hereinafter. The CPU calculates the predicted passage position pbi by applying the specific vehicle information (the current position pai of the wheel $11i$, the velocity Vs, the azimuth angle θ, and the yaw rate Yr) and the look-ahead time tpi to the equation corresponding to the wheel $11i$ from among the equations (27) to (34). With the third calculation method, the CPU can calculate the predicted passage position pbi by further considering the yaw rate Yr. The CPU can calculate the predicted passage position pbi with higher accuracy than the first calculation method.

$$x_{t2fl} = \tag{27}$$
$$x_{t1fl} + Vs \cdot tpfl \cdot \cos\theta + l_f \cos(\theta + Yr \cdot tpfl) + \frac{T_f}{2}\cos\left(\theta + Yr \cdot tpfl - \frac{\pi}{2}\right)$$

$$y_{t2fl} = \tag{28}$$
$$y_{t1fl} + Vs \cdot tpfl \cdot \sin\theta + l_f \sin(\theta + Yr \cdot tpfl) + \frac{T_f}{2}\sin\left(\theta + Yr \cdot tpfl - \frac{\pi}{2}\right)$$

$$x_{t2fr} = \tag{29}$$
$$x_{t1fr} + Vs \cdot tpfr \cdot \cos\theta + l_f \cos(\theta + Yr \cdot tpfr) + \frac{T_f}{2}\cos\left(\theta + Yr \cdot tpfr + \frac{\pi}{2}\right)$$

$$y_{t2fr} = \tag{30}$$
$$y_{t1fr} + Vs \cdot tpfr \cdot \sin\theta + l_f \sin(\theta + Yr \cdot tpfr) + \frac{T_f}{2}\sin\left(\theta + Yr \cdot tpfr + \frac{\pi}{2}\right)$$

$$x_{t2rl} = \tag{31}$$
$$x_{t1rl} + Vs \cdot tprl \cdot \cos\theta - l_r \cos(\theta + Yr \cdot tprl) + \frac{T_r}{2}\cos\left(\theta + Yr \cdot tprl - \frac{\pi}{2}\right)$$

$$y_{t2rl} = \tag{32}$$
$$y_{t1rl} + Vs \cdot tprl \cdot \sin\theta - l_r \sin(\theta + Yr \cdot tprl) + \frac{T_r}{2}\sin\left(\theta + Yr \cdot tprl - \frac{\pi}{2}\right)$$

$$x_{t2rr} = \tag{33}$$
$$x_{t1rr} + Vs \cdot tprr \cdot \cos\theta - l_r \cos(\theta + Yr \cdot tprr) + \frac{T_r}{2}\cos\left(\theta + Yr \cdot tprr + \frac{\pi}{2}\right)$$

$$y_{t2rr} = \tag{34}$$
$$y_{t1rr} + Vs \cdot tprr \cdot \sin\theta - l_r \sin(\theta + Yr \cdot tprr) + \frac{t_r}{2}\sin\left(\theta + Yr \cdot tprr + \frac{\pi}{2}\right)$$

The CPU may calculate the predicted passage position pbi according to the following equations (35) to (42). A calculation method of the predicted passage position pbi according to the equations (35) to (42) is a method in which the vehicle body slip angle β is added to the specific vehicle information, and will be referred to as a "fourth calculation method" hereinafter. The vehicle body slip angle β is calculated according to a predetermined method based on, for example, the second acceleration ay, the velocity Vs, and the yaw rate Yr. The CPU calculates the predicted passage position pbi by applying the specific vehicle information (the current position pai of the wheel $11i$, the velocity Vs, the azimuth angle θ, and the vehicle body slip angle β) and the look-ahead time tpi to the equation corresponding to the wheel $11i$ from among the equations (35) to (42). With the fourth calculation method, the CPU can calculate the predicted passage position pbi by further considering the vehicle body slip angle β. The CPU can calculate the predicted passage position pbi with higher accuracy than the first calculation method.

$$x_{t2fl} = x_{t1fl} + Vs \cdot tpfl \cdot \cos\theta + l_f\cos(\theta + \beta) + \frac{T_f}{2}\cos\left(\theta + \beta - \frac{\pi}{2}\right) \tag{35}$$

$$y_{t2fl} = y_{t1fl} + Vs \cdot tpfl \cdot \sin\theta + l_f\sin(\theta + \beta) + \frac{T_f}{2}\sin\left(\theta + \beta - \frac{\pi}{2}\right) \tag{36}$$

$$x_{t2fr} = x_{t1fr} + Vs \cdot tpfr \cdot \cos\theta + l_f\cos(\theta + \beta) + \frac{T_f}{2}\cos\left(\theta + \beta + \frac{\pi}{2}\right) \tag{37}$$

$$y_{t2fr} = y_{t1fr} + Vs \cdot tpfr \cdot \sin\theta + l_f\sin(\theta + \beta) + \frac{T_f}{2}\sin\left(\theta + \beta + \frac{\pi}{2}\right) \tag{38}$$

$$x_{t2rl} = x_{t1rl} + Vs \cdot tprl \cdot \cos\theta - l_r\cos(\theta + \beta) + \frac{T_r}{2}\cos\left(\theta + \beta - \frac{\pi}{2}\right) \tag{39}$$

$$y_{t2rl} = y_{t1rl} + Vs \cdot tprl \cdot \sin\theta - l_r\sin(\theta + \beta) + \frac{T_r}{2}\sin\left(\theta + \beta - \frac{\pi}{2}\right) \tag{40}$$

$$x_{t2rr} = x_{t1rr} + Vs \cdot tprr \cdot \cos\theta - l_r\cos(\theta + \beta) + \frac{T_r}{2}\cos\left(\theta + \beta + \frac{\pi}{2}\right) \tag{41}$$

$$y_{t2rr} = y_{t1rr} + Vs \cdot tprr \cdot \sin\theta - l_r\sin(\theta + \beta) + \frac{T_r}{2}\sin\left(\theta + \beta + \frac{\pi}{2}\right) \tag{42}$$

The CPU may calculate the predicted passage position pbi according to the following equations (43) to (50). A calculation method of the predicted passage position pbi according to the equations (43) to (50) is a method in which the first acceleration ax, the second acceleration ay, the yaw rate Yr, and the vehicle body slip angle β are added to the specific vehicle information, and will be referred to as a "fifth calculation method" hereinafter. The CPU calculates the predicted passage position pbi by applying the specific vehicle information (the current position pai of the wheel $11i$, the velocity Vs, the azimuth angle θ, the first acceleration ax, the second acceleration ay, the yaw rate Yr, and the vehicle body slip angle β) and the look-ahead time tpi to the equation corresponding to the wheel $11i$ from among the equations (43) to (50). With the fifth calculation method, the CPU can calculate the predicted passage position pbi with higher accuracy than any one of the first to the fourth calculation methods.

$$x_{t2fl} = x_{t1fl} + Vs \cdot tpfl \cdot \cos\theta + \frac{tpfl^2}{2}(a_x\cos\theta - a_y\sin\theta) + \tag{43}$$
$$l_f\cos(\theta + Yr \cdot tpfl + \beta) + \frac{T_f}{2}\cos\left(\theta + Yr \cdot tpfl + \beta - \frac{\pi}{2}\right)$$

$$y_{t2fl} = y_{t1fl} + Vs \cdot tpfl \cdot \sin\theta + \frac{tpfl^2}{2}(a_x\sin\theta + a_y\cos\theta) + \tag{44}$$
$$l_f\sin(\theta + Yr \cdot tpfl + \beta) + \frac{T_f}{2}\sin\left(\theta + Yr \cdot tpfl + \beta - \frac{\pi}{2}\right)$$

$$x_{t2fr} = x_{t1fr} + Vs \cdot tpfr \cdot \cos\theta + \frac{tpfr^2}{2}(a_x\cos\theta - a_y\sin\theta) + \tag{45}$$
$$l_f\cos(\theta + Yr \cdot tpfr + \beta) + \frac{T_f}{2}\cos\left(\theta + Yr \cdot tpfr + \beta - \frac{\pi}{2}\right)$$

$$y_{t2fr} = y_{t1fr} + Vs \cdot tpfr \cdot \sin\theta + \frac{tpfr^2}{2}(a_x\sin\theta + a_y\cos\theta) + \tag{46}$$
$$l_f\sin(\theta + Yr \cdot tpfr + \beta) + \frac{T_f}{2}\sin\left(\theta + Yr \cdot tpfr + \beta - \frac{\pi}{2}\right)$$

$$x_{t2rl} = x_{t1rl} + Vs \cdot tprl \cdot \cos\theta + \frac{tprl^2}{2}(a_x\cos\theta - a_y\sin\theta) - \tag{47}$$
$$l_r\cos(\theta + Yr \cdot tprl + \beta) + \frac{T_r}{2}\cos\left(\theta + Yr \cdot tprl + \beta - \frac{\pi}{2}\right)$$

$$y_{t2rl} = y_{t1rl} + Vs \cdot tprl \cdot \sin\theta + \frac{tprl^2}{2}(a_x\sin\theta + a_y\cos\theta) - \tag{48}$$
$$l_r\sin(\theta + Yr \cdot tprl + \beta) + \frac{T_r}{2}\sin\left(\theta + Yr \cdot tprl + \beta - \frac{\pi}{2}\right)$$

-continued $$x_{t2rr} = x_{t1rr} + Vs \cdot tprr \cdot \cos\theta + \frac{tprr^2}{2}(a_x\cos\theta - a_y\sin\theta) - \qquad(49)$$

$$l_r\cos(\theta + Yr \cdot tprr + \beta) + \frac{T_r}{2}\cos\left(\theta + Yr \cdot tprr + \beta - \frac{\pi}{2}\right)$$

$$y_{t2rr} = y_{t1rr} + Vs \cdot tprr \cdot \sin\theta + \frac{tprr^2}{2}(a_x\sin\theta + a_y\cos\theta) - \qquad(50)$$

$$l_r\sin(\theta + Yr \cdot tprr + \beta) + \frac{T_r}{2}\sin\left(\theta + Yr \cdot tprr + \beta - \frac{\pi}{2}\right)$$

Third Modified Example of First Apparatus

In step 1205, the CPU may acquire the unsprung displacement $z_1$ of the predicted passage position pbi as below. The CPU transmits the predicted passage position pbi to the server 61. The server 61 acquires the unsprung displacement ($z_1$) 63b associated with the predicted passage position pbi. The server 61 transmits the unsprung displacement ($z_1$) 63b to the ECU 30. In this case, since the CPU communicates with the server 61, a communication delay time occurs in the communication. Therefore, in this configuration, in step 1203, the CPU may predict the communication delay time and add the predicted communication delay time to the calculation delay time ta1.

Fourth Modified Example of First Apparatus

The velocity Vs and the proceeding direction of the vehicle 10 may be acquired based on information other than the GNSS signal. The CPU may calculate the velocity Vs from a wheel velocity sensor (not shown) provided in each wheel 11. As described above, the CPU temporarily stores, in the RAM 30c, a history of the position of the vehicle 10 which is specified by using the LiDAR, the camera sensor, and the like. The CPU may calculate the proceeding direction of the vehicle 10 from the history of the position.

Second Embodiment

Next, the configuration of the vibration damping control apparatus 20 according to a second embodiment (hereinafter, sometimes referred to as a "second apparatus") will be described. As described above, since the behavior of the vehicle 10 (the velocity Vs, the proceeding direction, and the like) is changed every moment, there is a case where reliability of the predicted passage position pbi decreases depending on the situation. Here, the reliability of the predicted passage position pbi means accuracy with which the predicted passage position pbi matches the position through which the wheel 11i actually passes at "a time point after the look-ahead time tpi elapsed from the current time point".

The look-ahead time tpi changes according to the calculation delay time ta1 and the response delay time ta2. As the look-ahead time tpi is long, a possibility that the behavior of the vehicle 10 may be changed during the period in which the look-ahead time tpi elapses is high. Therefore, the reliability of the predicted passage position pbi may decrease. When the ECU 30 acquires, from the road surface information 64, the unsprung displacement ($z_1$) 63b based on the predicted passage position pbi with low reliability, the acquired unsprung displacement ($z_1$) 63b differs from the unsprung displacement $z_1$ that actually occurs in the vehicle 10. For this reason, when the preview vibration damping control is executed, there is a possibility that vibration in the sprung portion 71 cannot be reduced or may worsen.

Then, before calculating the predicted passage position pbi, the ECU 30 estimates the reliability of the predicted passage position pbi. Specifically, the ECU 30 determines which of three levels (a rank, an accuracy level) the reliability of the predicted passage position pbi falls under. In this example, the level of reliability (hereinafter referred to as a "reliability level") of the predicted passage position pbi includes a first level, a second level, and a third level.

The first level, also referred to as a high level, is a level at which the reliability of the predicted passage position pbi is estimated to be the highest. When the reliability level of the predicted passage position pbi is the first level, the ECU 30 considers that the predicted passage position pbi matches the position through which the wheel 11i actually passes. Therefore, the ECU 30 executes the preview vibration damping control as described above.

The second level, also referred to as an intermediate level, is a level at which the reliability of the predicted passage position pbi is higher than the third level but lower than the first level. When the reliability level of the predicted passage position pbi is the second level, the ECU 30 changes the magnitude of the target control force Fcti as to be described below.

The third level, also referred to as a low level, is a level at which the reliability of the predicted passage position pbi is estimated to be the lowest. When the reliability level of the predicted passage position pbi is the third level, the ECU 30 considers that the possibility that the predicted passage position pbi may match the position through which the wheel 11i actually passes is low, and sets the target control force Fcti to zero as described below (that is, the preview vibration damping control is not substantially executed).

The ECU 30 determines whether a first condition is satisfied in order to estimate the reliability of the predicted passage position pbi (that is, in order to determine the reliability level). The first condition is a condition for determining whether the reliability level of the predicted passage position pbi is the first level. In this example, the first condition is satisfied when the look-ahead time tpi is equal to or less than a first time threshold value Ts1. The first time threshold value Ts1 is a value greater than zero and less than 1 second (0<Ts1<1 s). For example, the first time threshold value Ts1 may be 200 milliseconds. Since the look-ahead time tpi is short when the first condition is satisfied, the possibility that the behavior of the vehicle 10 may be changed during the period in which the look-ahead time tpi elapses is also low. Therefore, it is considered that the reliability of the predicted passage position pbi is high. When the first condition is satisfied, the ECU 30 determines (estimates) that the reliability level of the predicted passage position pbi is the first level. In this case, the ECU 30 calculates the target control force Fcti according to the following equation (51) and executes the preview vibration damping control. The equation (51) is the same as the equation (7), and $\beta_{2i}$ is a gain which is set for each wheel 11i.

$$Fcti = \beta_{2i} \times z_1 \qquad(51)$$

On the other hand, when the first condition is not satisfied, the ECU 30 determines whether a second condition is satisfied. The second condition is a condition for determining whether the reliability level of the predicted passage position pbi is the second level. In this example, the second condition is satisfied when the look-ahead time tpi is equal to or less than a second time threshold value Ts2. The second time threshold value Ts2 is a value greater than the first time threshold value Ts1 and less than 1 second (Ts1<Ts2<1 s). When the second condition is satisfied, the ECU 30 determines (estimates) that the reliability level of the predicted passage position pbi is the second level. On the other hand, when the second condition is not satisfied, the ECU 30 determines (estimates) that the reliability level of the predicted passage position pbi is the third level.

When the reliability level of the predicted passage position pbi is the second level, a deviation may occur between the predicted passage position pbi and the position through which the wheel 11i actually passes. Therefore, the ECU 30 calculates the target control force Fcti according to the following equation (52) and executes the preview vibration damping control. $\beta_{2i}'$ is a gain which is set for each wheel 11i, and smaller than the gain $\beta_{2i}$ of the equation (51) ($\beta_{2i}'<\beta_{2i}$).

$$Fcti=\beta_{2i}'\times z_1 \qquad (52)$$

Therefore, the ECU 30 sets the magnitude of the target control force Fcti such that it is smaller when the reliability level is the second level than when the reliability level is the first level. In other words, the ECU 30 sets the degree of influence of the unsprung displacement ($z_1$), which is obtained based on the predicted passage position pbi, on the target control force Fcti such that it is lower when the reliability level is the second level than when the reliability level is the first level.

When a deviation occurs between the predicted passage position pbi and the position through which the wheel 11i actually passes at "the time at which the look-ahead time tpi has elapsed since the current time point" and the preview vibration damping control is executed by using a normal target control force Fcti (=equation (51)), vibration in the sprung portion 71 may worsen. On the other hand, with the above configuration, since the magnitude of the target control force Fcti is small when the reliability level is the second level, the possibility that vibration in the sprung portion 71 may worsen can be reduced.

Further, when the reliability level of the predicted passage position pbi is the third level, the possibility that a relatively large deviation may occur between the predicted passage position pbi and the position through which the wheel 11i actually passes is high. In this case, the ECU 30 sets the target control force Fcti to zero. As such, since the preview vibration damping control is not substantially executed, the possibility that vibration in the sprung portion 71 may worsen can be reduced.

Vibration Damping Control Routine

Figure 13:
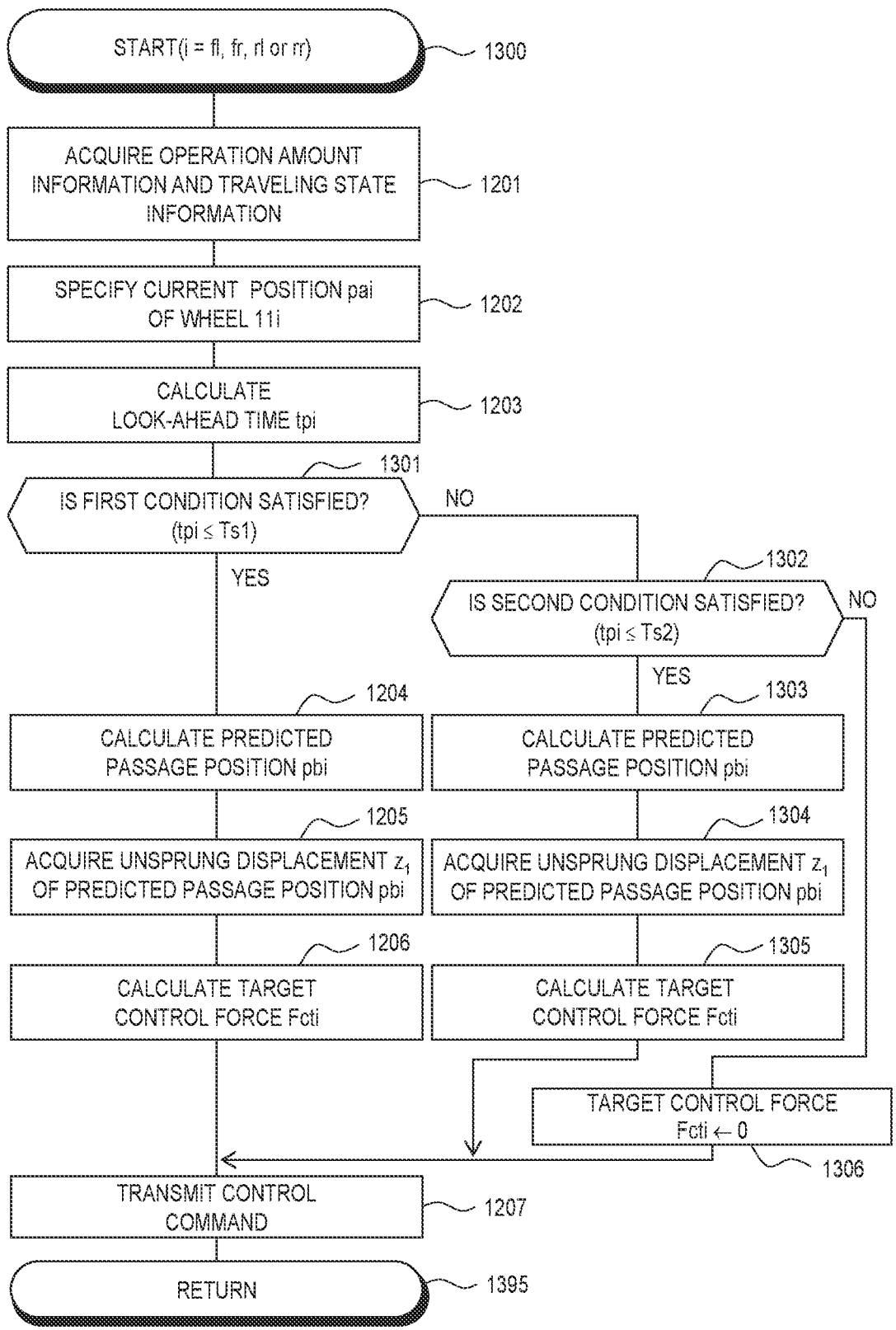
FIG. 13 is a flowchart illustrating a "vibration damping control routine" executed by a CPU of an electronic control device according to a second embodiment.

The CPU of the ECU 30 executes a vibration damping control routine illustrated in FIG. 13 instead of the routine illustrated in FIG. 12. The routine of FIG. 13 is a routine in which steps 1301 to 1306 are added to the routine of FIG. 12. From among the steps illustrated in FIG. 13, the steps in which the same processes as those in the steps illustrated in FIG. 12 are executed are denoted by the same step numbers as those used in FIG. 12 and the description thereof will be omitted.

At a predetermined timing, the CPU starts processes from step 1300, executes the processes of steps 1201 to 1203 in order, and then proceeds to step 1301. The CPU determines whether the above-described first condition is satisfied. When the first condition is satisfied, the CPU determines "Yes" in step 1301 and executes the processes of steps 1204 to 1207 as described above in order. In step 1206, the CPU calculates the target control force Fcti according to the equation (51). Thereafter, the CPU proceeds to step 1395 and temporarily ends this routine.

On the other hand, when the first condition is not satisfied, the CPU determines "No" in step 1301, proceeds to step 1302, and determines whether the above-described second condition is satisfied. When the second condition is satisfied, the CPU determines "Yes" in step 1302 and executes the processes of steps 1303 to 1305 to be described below in order. Thereafter, the CPU executes the process of step 1207, proceeds to step 1395, and temporarily ends this routine.

Step 1303: The CPU calculates the predicted passage position pbi according to the first calculation method. Step 1304: The CPU acquires the unsprung displacement ($z_1$) 63b at the predicted passage position pbi calculated in step 1303, from the road surface information 64 stored in the RAM 30c. Step 1305: According to the equation (52), the CPU calculates the target control force Fcti by using the unsprung displacement $z_1$ acquired in step 1303.

On the other hand, when the second condition is not satisfied in step 1302, the CPU determines "No" in step 1302, proceeds to step 1306, and sets the target control force Fcti to zero. Thereafter, the CPU executes the process of step 1207, proceeds to step 1395, and temporarily ends this routine.

When the reliability level is the second level, an error may occur between the predicted passage position pbi and the position through which the wheel 11i actually passes. With the above configuration, the vibration damping control apparatus 20 sets the magnitude of the target control force Fcti such that it is smaller when the reliability level is the second level than when the reliability level is the first level. Therefore, since the magnitude of the target control force Fcti is small, the possibility that vibration in the sprung portion 71 may worsen can be reduced.

When the reliability level is the third level, a possibility that a large error may occur between the predicted passage position pbi and the position through which the wheel 11i actually passes is high. With the above configuration, when the reliability level is the third level, the vibration damping control apparatus 20 sets the target control force Fcti to zero. As such, since the preview vibration damping control is not substantially executed, the possibility that vibration in the sprung portion 71 may worsen can be reduced.

First Modified Example of Second Apparatus

In step 1305, the CPU may change the gain $\beta_{2i}'$ of the equation (52) according to the look-ahead time tpi. For example, the CPU may set the gain $\beta_{2i}'$ such that the gain $\beta_{2i}'$ becomes smaller as the look-ahead time tpi is longer.

Second Modified Example of Second Apparatus

In step 1303, the CPU may calculate the predicted passage position pbi according to any one of the second calculation method to the fifth calculation method. With this configuration, when the reliability level of the predicted passage position pbi is the second level, the CPU calculates the predicted passage position pbi according to a more highly accurate calculation method than the first calculation method. The possibility that a deviation may occur between the predicted passage position pbi and the position through which the wheel 11i actually passes can be reduced. Therefore, the possibility that vibration in the sprung portion 71 may worsen can be reduced. In this example, the CPU may calculate the target control force Fcti according to the equation (51) in step 1305.

Third Modified Example of Second Apparatus

In step 1305, the CPU may calculate the target control force Fcti according to the following equation (53). $G_1$ and $G_2$ are gains, respectively. $G_1$ is referred to as a "first gain" and $G_2$ is referred to as a "second gain".

$$Fcti=G_1\cdot Fct1+G_2\cdot Fct2 \qquad (53)$$

$$Fct1=\beta_{2i}\times z_1 \qquad (54)$$

$$Fct2=\gamma_0\times dz_2 \qquad (55)$$

The "Fct1" in the equation (53) is a target control force for the feedforward control, and is calculated according to the equation (54). The right side of the equation (54) is the same as the right side of the equation (51). Hereinafter, Fct1 will be referred to as a "first target control force Fct1".

The Fct2 is a target control force for feedback control for damping vibration in the sprung portion 71, and is referred to as a "second target control force Fct2". The Fct2 is obtained such that the sprung velocity $dz_2$ is set to zero. $\gamma_0$ is a gain. The CPU calculates the sprung velocity $dz_2$ from the traveling state information (specifically, the sprung acceleration $ddz_2$). Then, the CPU calculates the second target control force Fct2 by applying the sprung velocity $dz_2$ to the equation (55).

The CPU determines the first gain $G_1$ with respect to the first target control force Fct1 according to the look-ahead time tpi. The ECU 30 determines the first gain $G_1$ by applying the look-ahead time tpi to the first gain map MPg1(tpi). The first gain map MPg1(tpi) is stored in advance in the ROM 30b of the ECU 30, and defines the relationship between the look-ahead time tpi and the first gain $G_1$. In the first gain map MPg1(tpi), the relationship between the look-ahead time tpi and the first gain $G_1$ is defined such that the first gain $G_1$ becomes smaller as the look-ahead time tpi is longer.

The CPU determines the second gain $G_2$ with respect to the second target control force Fct2 according to the look-ahead time tpi. The ECU 30 determines the second gain $G_2$ by applying the look-ahead time tpi to the second gain map MPg2(tpi). The second gain map MPg2(tpi) is stored in advance in the ROM 30b of the ECU 30, and defines the relationship between the look-ahead time tpi and the second gain $G_2$. In the second gain map MPg2(tpi), the relationship between the look-ahead time tpi and the second gain $G_2$ is defined such that the second gain $G_2$ becomes larger as the look-ahead time tpi is longer.

In one example, when the reliability level of the predicted passage position pbi is the second level, the CPU may set the first gain $G_1$ and the second gain $G_2$ by using the first gain map MPg1(tpi) and the second gain map Mpg2(tpi), such that the second gain $G_2$ is larger than the first gain $G_1$. With this configuration, when the reliability level of the predicted passage position pbi is the second level, a component of the first target control force Fct1 in the target control force Fcti is small and a component of the second target control Fct2 in the target control force Fcti is large. As such, the degree of influence of the unsprung displacement $z_1$ at the predicted passage position pbi on the target control force Fcti is lower when the reliability level is the second level than when the reliability level is the first level. Therefore, vibration in the sprung portion 71 can be gradually reduced by the feedback control while preventing vibration in the sprung portion 71 from worsening.

When the reliability level of the passage prediction position pbi is the second level, the CPU may change only one of the first gain $G_1$ and the second gain $G_2$. For example, the CPU changes the first gain $G_1$ such that the first gain $G_1$ becomes smaller as the look-ahead time tpi is longer. The CPU sets the second gain $G_2$ to a constant value. With this configuration, since the ratio of the component of the second target control force Fct2 in the target control force Fcti is large, it is possible to restrain vibration in the sprung portion 71 from worsening.

In another example, when the reliability level of the predicted passage position pbi is the second level, the CPU sets the first gain $G_1$ to a constant value. The CPU changes the second gain $G_2$ such that the second gain $G_2$ becomes larger as the look-ahead time tpi is longer. With this configuration as well, since the ratio of the component of the second target control force Fct2 in the target control force Fcti is large, it is possible to restrain vibration in the sprung portion 71 from worsening.

As described above, the CPU may change one or both of the first gain $G_1$ and the second gain $G_2$ such that the degree of influence of the first target control force Fct1 (that is, a component based on the unsprung displacement $z_1$ at the predicted passage position pbi) on the target control force Fcti is lower when the reliability level is the second level than when the reliability level is the first level.

Further, when the CPU proceeds to step 1306 (that is, when the reliability level of the predicted passage position pbi is the third level), the CPU may calculate the target control force Fcti according to the equation (53). In this case, the CPU may set the first gain $G_1$ to zero and the second gain $G_2$ to a relatively large value.

An equation that calculates the control force for the feedback control is not limited to the equation (55), and may be an equation including at least one of the terms of the sprung displacement $z_2$, the sprung velocity $dz_2$, the sprung acceleration $ddz_2$, the unsprung displacement $z_1$, and the unsprung velocity $dz_1$. For example, the CPU may calculate the second target control force Fct2 according to the following equation (56). Here, $\gamma_1$, $\gamma_2$, $\gamma_3$, $\gamma_4$, $\gamma_5$ are gains, respectively.

$$Fct2 = \gamma_1 \times ddz_2 + \gamma_2 \times dz_2 + \gamma_3 \times z_2 + \gamma_4 \times dz_1 + \gamma_5 \times z_1 \quad (56)$$

The second target control force Fct2 may further include a control force other than the control force for the feedback control. For example, the second target control force Fct2 may further include the target control force for the feedforward control. The CPU may calculate the second target control force Fct2 according to the following equation (57). $\beta_3$ and $\beta_4$ are gains, respectively.

$$Fct2 = \gamma_0 \times dz_2 + \beta_3 \times z_0 + \beta_4 \times z_1 \quad (57)$$

The first term on the right side of the equation (57) is the target control force for the above-described feedback control. The second term on the right side is the target control force for the feedforward control, and is calculated by using the road surface displacement $z_0$, in front of the vehicle 10, acquired by the preview sensor 51. The third term on the right side is the target control force for the feedforward control of the rear wheel 11r. The possibility that the rear wheel 11r may trace the route of the front wheel 11f is high. The CPU calculates the unsprung displacement $z_1$ based on the unsprung acceleration $ddz_2$ acquired by the sprung acceleration sensor 47f of the front wheel 11f and the stroke H acquired by the stroke sensor 48f of the front wheel 11f, and applies the unsprung displacement $z_1$ to the third term. When the second target control force Fct2 of the front wheel 11f is calculated, the third term is omitted. When the reliability level of the predicted passage position pbi is the second level, the accuracy of the road surface displacement $z_0$ applied to the second term and the accuracy of the unsprung displacement $z_1$ applied to the third term may be higher than the accuracy of the unspring displacement ($z_1$) 63b acquired from the road surface information 64. Therefore, vibration in the sprung portion 71 can be reduced by the second target control force Fct2 calculated according to the equation (57).

Fourth Modified Example of Second Apparatus

The first condition and the second condition are not limited to the above examples as long as the reliability level of the predicted passage position pbi can be estimated. When the vehicle 10 is accelerating or decelerating and/or when the vehicle 10 is turning, a relatively large error may occur between the predicted passage position pbi and the position through which the wheel 11i actually passes. In other words, in such a case, the reliability level of the predicted passage position pbi is lowered.

Therefore, the first condition and the second condition may be conditions associated with the driving operation amount. In this configuration, the CPU determines whether the first condition and the second condition are satisfied by using the operation amount information acquired from the information acquisition device 40. In step 1301, when at least one of the following conditions A1 to A3 is satisfied, the CPU determines that the first condition is satisfied.

(A1) The accelerator pedal operation amount AP is equal to or less than a first accelerator operation amount threshold value AP1.

(A2) The brake pedal operation amount BP is equal to or less than a first brake operation amount threshold value BP1.

(A3) The absolute value of the steering torque Tr is equal to or less than a first steering threshold value Tr1.

The first condition may further include a condition on at least one of the time differential value (velocity and/or acceleration) of the accelerator pedal operation amount AP, the time differential value (velocity and/or acceleration) of the brake pedal operation amount BP, and the time differential value (velocity and/or acceleration) of the steering torque Tr.

In step 1302, when at least one of the following conditions B1 to B3 is satisfied, the CPU determines that the second condition is satisfied by using the operation amount information.

(B1) The accelerator pedal operation amount AP is equal to or less than a second accelerator operation amount threshold value AP2. The second accelerator operation amount threshold value AP2 is greater than the first accelerator operation amount threshold value AP1.

(B2) The brake pedal operation amount BP is equal to or less than a second brake operation amount threshold value BP2. The second brake operation amount threshold value BP2 is greater than the first brake operation amount threshold value BP1.

(B3) The absolute value of the steering torque Tr is equal to or less than a second steering threshold value Tr2. The second steering threshold value Tr2 is greater than the first steering threshold value Tr1.

The second condition may further include a condition on at least one of the time differential value (velocity and/or acceleration) of the accelerator pedal operation amount AP, the time differential value (speed and/or acceleration) of the brake pedal operation amount BP, and the time differential value (velocity and/or acceleration) of the steering torque Tr. The first condition and the second condition may further include another condition on the driving operation amount. For example, the first condition and the second condition may further include a condition on a rotation angle of the steering wheel SW, respectively.

The first condition and the second condition may be conditions on a traveling state amount indicating the traveling state of the vehicle 10. In this example, the traveling state amount includes the first acceleration ax, the second acceleration ay, and the yaw rate Yr. In this configuration, the CPU determines whether the first condition and the second condition are satisfied by using the traveling state information acquired from the information acquisition device 40. In step 1301, when at least one of the following conditions A4 to A6 is satisfied, the CPU determines that the first condition is satisfied.

(A4) The absolute value of the first acceleration ax is equal to or less than a first front-rear acceleration threshold value ax1.

(A5) The absolute value of the second acceleration ay is equal to or less than a first lateral acceleration threshold value ay1.

(A6) The absolute value of the yaw rate Yr is equal to or less than a first yaw rate threshold value Yr1.

In step 1302, when at least one of the following conditions B4 to B6 is satisfied, the CPU determines that the second condition is satisfied by using the traveling state information.

(B4) The absolute value of the first acceleration ax is equal to or less than a second front-rear acceleration threshold value ax2. The second front-rear acceleration threshold value ax2 is greater than the first front-rear acceleration threshold value ax1.

(B5) The absolute value of the second acceleration ay is equal to or less than a second lateral acceleration threshold value ay2. The second lateral acceleration threshold value ay2 is greater than the first lateral acceleration threshold value ay1.

(B6) The absolute value of the yaw rate Yr is equal to or less than a second yaw rate threshold value Yr2. The second yaw rate threshold value Yr2 is greater than the first yaw rate threshold value Yr1.

The first condition and the second condition may further include another condition on the traveling state amount. For example, the first condition and the second condition may further include a condition on the velocity Vs, a condition on the steering angle of the vehicle 10, a condition on a command value (for example, required acceleration) for an engine (not shown), and a command value (for example, required deceleration) for a braking mechanism (not shown), respectively.

Fifth Modified Example of Second Apparatus

The reliability level of the predicted passage position pbi may include only two levels, that is, the first level and the second level. In this configuration, steps 1302 and 1306 may be omitted in the routine of FIG. 13. In this case, upon determining "No" in step 1301, the CPU executes the processes of steps 1303 to 1305 and then executes the process of step 1207.

In another example, steps 1302 to 1305 may be omitted in the routine of FIG. 13. Upon determining "No" in step 1301, the CPU executes the process of step 1306 and then executes the process of step 1207. In other words, when the reliability level of the predicted passage position pbi is not the first level, the CPU may set the target control force Fcti to zero. In this case, the preview vibration damping control is not substantially executed.

Sixth Modified Example of Second Apparatus

The first condition and the second condition may be conditions on a movement distance of the wheel 11i. When the CPU can predict that a distance that the wheel 11 moves during a time period from the current time point to a time point after the look-ahead time tpi is long, an error may occur between the predicted passage position pbi and the position through which the wheel 11i actually passes.

Then, the CPU predicts, based on the predicted passage position pbi, the distance that the wheel 11i moves during the time period from the current time point to the time point at which the look-ahead time tpi has elapsed. The distance is referred to as a "movement distance Dt". Specifically, the CPU obtains the predicted passage position pbi of the wheel 11$i$ as described above, and calculates, as the movement distance Dt, the distance between the current position pai of the wheel 11$i$ and the predicted passage position pbi. Then, as described below, the CPU determines whether the first condition and the second condition are satisfied by using the movement distance Dt.

In this example, the first condition is satisfied when the movement distance Dt is equal to or less than a first distance threshold value Ds1. The first distance threshold value Ds1 may be, for example, a value equal to or greater than half the value of the tire width of the wheel 11 and less than the value of the tire width. When the first condition is not satisfied, the CPU determines whether the second condition is satisfied. The second condition is satisfied when the movement distance Dt is equal to or less than a second distance threshold value Ds2. The second distance threshold value Ds2 is a value greater than the first distance threshold value Ds1, and may be, for example, a value equal to or greater than the value of the tire width.

Figure 14:
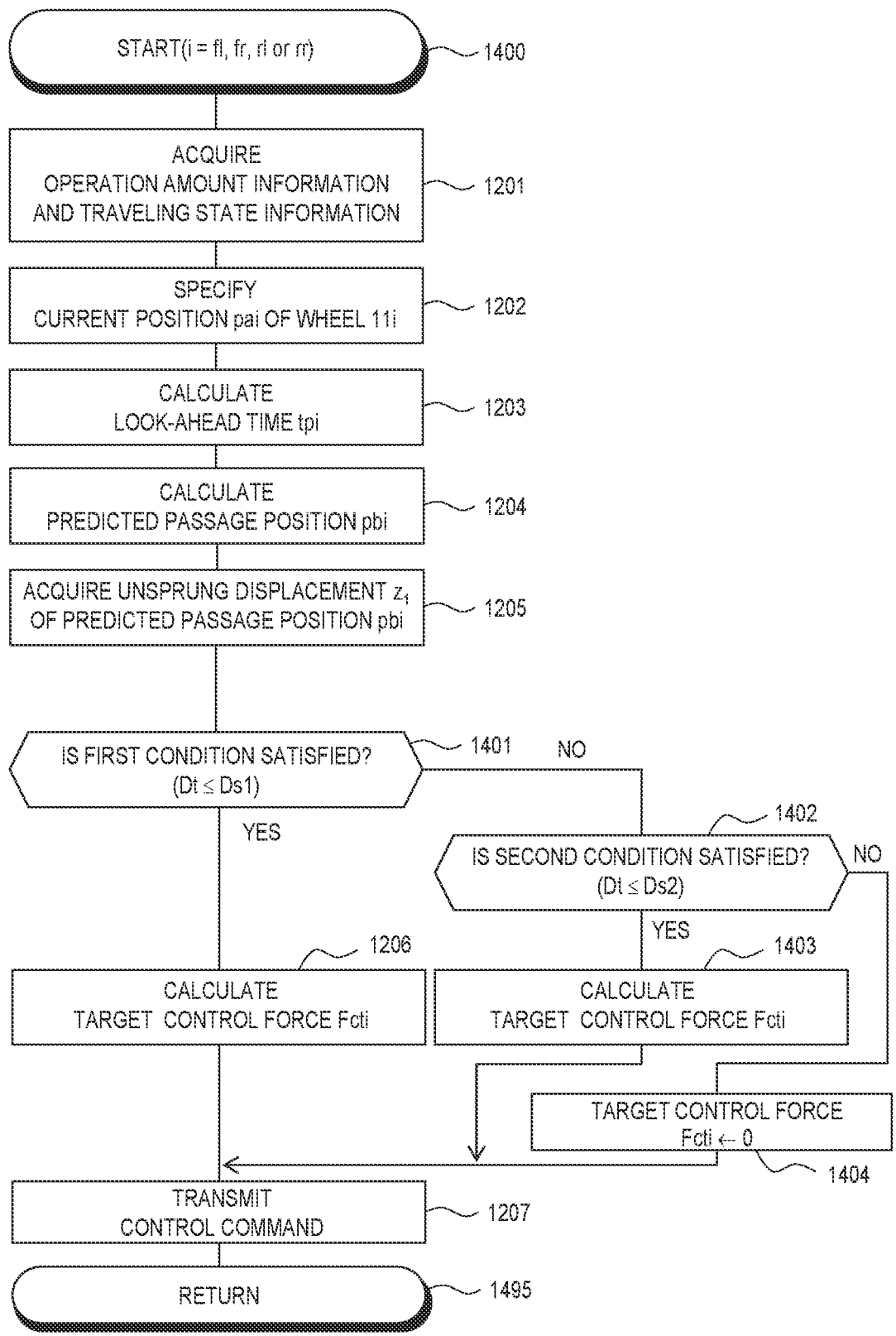
FIG. 14 is a flowchart illustrating a "vibration damping control routine" executed by a CPU of an electronic control device according to a modified example of the second embodiment.

The CPU of the sixth modified example of the second apparatus executes a vibration damping control routine illustrated in FIG. 14 instead of the routine illustrated in FIG. 12. The routine of FIG. 14 is a routine in which steps 1401 to 1404 are added to the routine of FIG. 12. From among the steps illustrated in FIG. 14, the steps in which the same processes as those in the steps illustrated in FIG. 12 are executed are denoted by the same step numbers as those used in FIG. 12 and the description thereof will be omitted.

At a predetermined timing, the CPU starts processes from step 1400, executes the processes of steps 1201 to 1205 in order, and then proceeds to step 1401. The CPU calculates (predicts) the movement distance Dt based on the current position pai and the predicted passage position pbi of the wheel 11$i$ as described above. Then, the CPU determines whether the first condition is satisfied. When the first condition is satisfied, the CPU determines "Yes" in step 1401 and executes the processes of steps 1206 and 1207 as described above in order. Thereafter, the CPU proceeds to step 1495 and temporarily ends this routine.

On the other hand, when the first condition is not satisfied, the CPU determines "No" in step 1401, proceeds to step 1402, and determines whether the second condition is satisfied. When the second condition is satisfied, the CPU determines "Yes" in step 1402 and calculates the target control force Fcti in step 1403. The process of step 1403 is the same as that of step 1305 of the routine of FIG. 13. Thereafter, the CPU executes the process of step 1207, proceeds to step 1495, and temporarily ends this routine.

On the other hand, when the second condition is not satisfied, the CPU determines "No" in step 1402, proceeds to step 1404, and sets the target control force Fcti to zero. Thereafter, the CPU executes the process of step 1207, proceeds to step 1495, and temporarily ends this routine.

In step 1204 of the routine of FIG. 14, the CPU may calculate the predicted passage position pbi according to any one of the second calculation method to the fifth calculation method. With this configuration, the CPU can calculate the movement distance Dt by considering the first acceleration ax, the second acceleration ay, the yaw rate Yr, and the like. The CPU can determine whether the first condition and the second condition are satisfied by using the more highly accurate movement distance Dt.

In another example, the CPU may calculate the movement distance Dt by using a simpler method. For example, the CPU may calculate the movement distance Dt by "velocity Vs×look-ahead time tpi". In yet another example, in order to consider the movement of the vehicle 10 in the lateral direction, the CPU may calculate the movement distance Dt based on the yaw rate Yr and the look-ahead time tpi. Further, the CPU may calculate the movement distance Dt based on the acceleration (ax or ay) and the look-ahead time tpi.

Third Embodiment

Next, a configuration of the vibration damping control apparatus 20 according to a third embodiment (hereinafter, sometimes referred to as a "third apparatus") will be described. In addition to the preview vibration damping control, the ECU 30 is configured to execute a steering control for changing the steering angle of the vehicle 10 such that the vehicle 10 travels along the target traveling line. Examples of such a steering control include a lane keeping control and a lane change assistance control.

The lane keeping control is a control for changing the steering angle of the vehicle such that the vehicle travels along the target traveling line set by utilizing a pair of lane markings that define a lane or a traveling tracing of a preceding vehicle, or both. The lane keeping control is known (see, for example, Japanese Unexamined Patent Application Publication No. 2008-195402, Japanese Unexamined Patent Application Publication No. 2009-190464, Japanese Unexamined Patent Application Publication No. 2010-6279, and Japanese Patent No. 4349210).

The lane change assistance control is a control for changing the steering angle of the vehicle such that the vehicle travels along the target traveling line for moving from a lane in which the vehicle is traveling (a first lane) to a second lane adjacent to the first lane. The lane change assistance control is known (see, for example, Japanese Unexamined Patent Application Publication No. 2016-207060 and Japanese Unexamined Patent Application Publication No. 2017-74823).

The target traveling line is a line that should match a specific position of the vehicle 10. Therefore, the specific position of the vehicle 10 moves on the target traveling line by the steering control. The "specific position of the vehicle" may be a predetermined central position of the vehicle 10 in a plan view, such as a central position of the left front wheel 11$fl$ and the right front wheel 11$fr$ in the plan view, or the left rear wheel 11$rl$ and the right rear wheel 11$rr$ in the plan view.

Further, recently, an apparatus that executes autonomous driving control for autonomously changing the steering angle and the velocity of the vehicle such that the vehicle travels according to a traveling plan (including the target traveling line) has also been developed. Hereinafter, controls such as the above-described steering control and autonomous driving control will be collectively referred to as a "driving assistance control".

In this example, as one aspect of the driving assistance control, the ECU 30 is configured to execute the lane keeping control. The ECU 30 sets the operation state of the lane keeping control to the on state or the off state according to an operation switch (not shown). Hereinafter, the operation state of the lane keeping control will be referred to as a "driving assistance operation state". During the execution of the driving assistance control, when a driver executes a predetermined driving operation (at least one of an operation of the steering wheel SW, an operation of the accelerator pedal 41$a$, and an operation of the brake pedal 42$a$), the ECU 30 may be configured to set the driving assistance operation state from the on state to the off state.

In the vehicle 10 that can execute the driving assistance control, it is necessary to obtain, with high accuracy, the predicted passage position pbi regardless of whether the driving assistance operation state is in the off state or the on state.

When the driving assistance operation state is in the off state (that is, when the driver is executing a manual driving operation), the ECU 30 calculates the predicted passage position pbi by using the azimuth angle θ acquired from the position information acquisition device 49 as described above. Therefore, the predicted passage position pbi can be calculated with high accuracy.

On the other hand, during the execution of the driving assistance control, since the ECU 30 causes the vehicle 10 to travel along the target traveling line, the proceeding direction of the vehicle 10 matches the direction in which the target traveling line extends. Therefore, when the driving assistance operation state is in the on state, the ECU 30 calculates the predicted passage position pbi by using the target traveling line as the proceeding direction of the vehicle 10.

Figure 15:
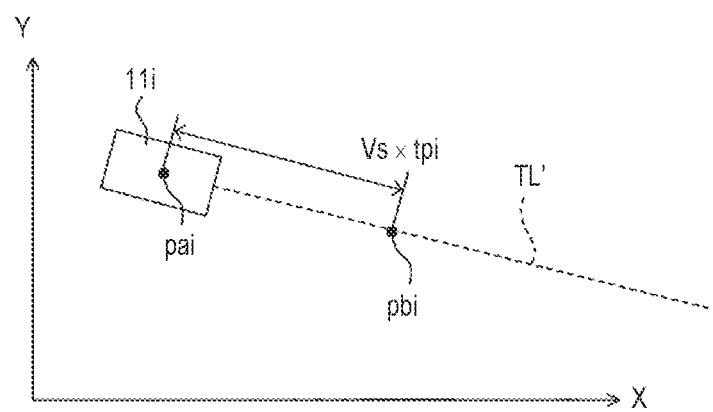
FIG. 15 is a graph used for describing a process for calculating a predicted passage position according to a third embodiment.

Specifically, as illustrated in FIG. 15, the ECU 30 sets a line TL' parallel to the target traveling line from the current position pai of the wheel 11i, and calculates, as the predicted passage position pbi, a position proceeded to the front by a value obtained by "multiplying the velocity Vs by the look-ahead time tpi (=Vs×tpi)" along the line TL' from the current position pai.

During the execution of the driving assistance control, the driver does not manually execute the driving operation. Therefore, the behavior of the vehicle 10 (the velocity Vs and the proceeding direction) is not suddenly changed by the driving operation of the driver. Therefore, a possibility that the proceeding direction of the vehicle 10 may match the direction in which the target traveling line extends is high. During the execution of the driving assistance control, the ECU 30 can calculate the highly accurate predicted passage position pbi by using the target traveling line as the proceeding direction of the vehicle 10. As described above, the predicted passage position pbi can be obtained with high accuracy regardless of whether the driving assistance operation state is in the off state or the on state.

Vibration Damping Control Routine

Figure 16:
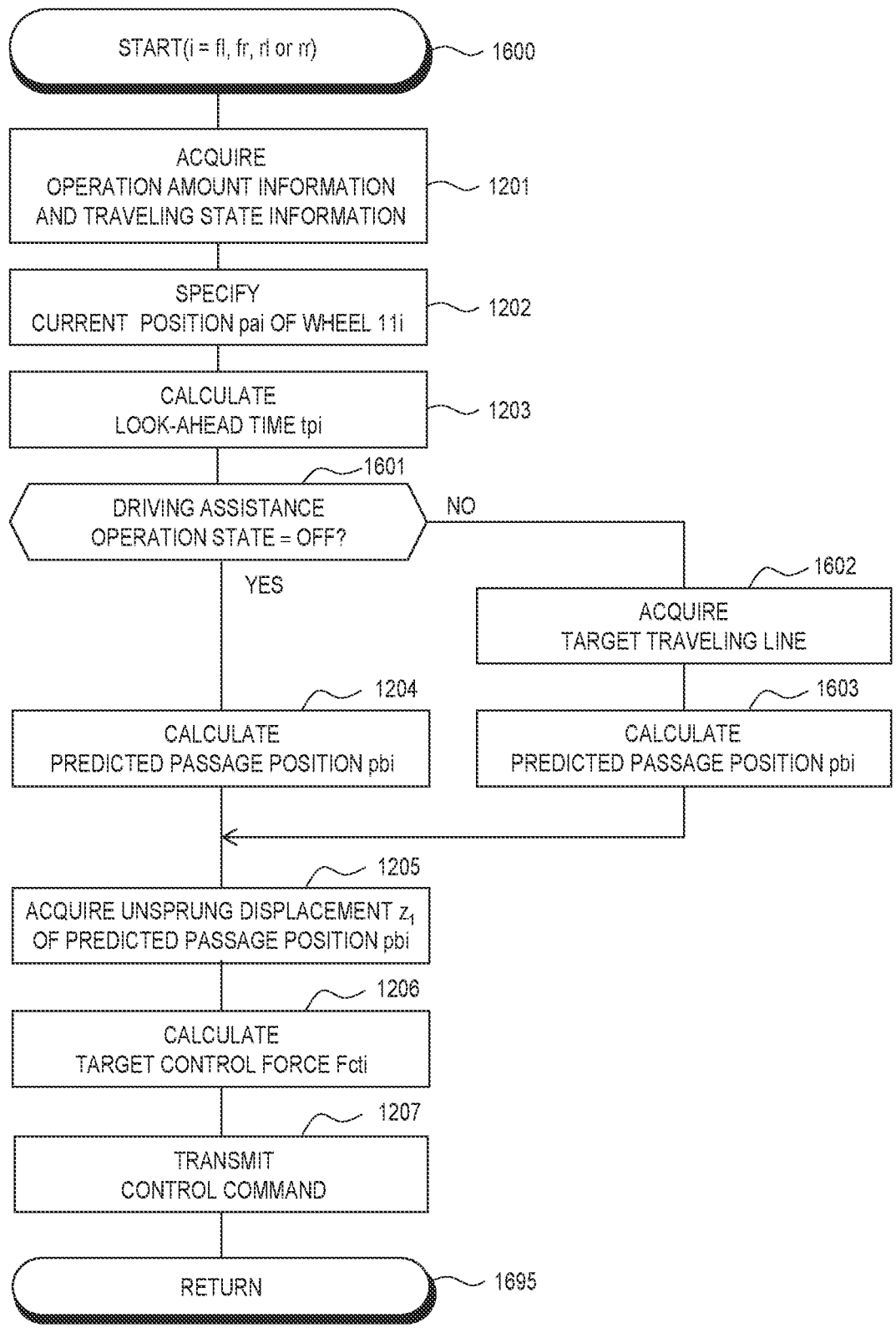
FIG. 16 is a flowchart illustrating a "vibration damping control routine" executed by a CPU of an electronic control device according to the third embodiment.

The CPU of the third embodiment executes a vibration damping control routine illustrated in FIG. 16 instead of the routine illustrated in FIG. 12. The routine of FIG. 16 is a routine in which steps 1601 to 1603 are added to the routine of FIG. 12. From among the steps illustrated in FIG. 16, the steps in which the same processes as those in the steps illustrated in FIG. 12 are executed are denoted by the same step numbers as those used in FIG. 12 and the description thereof will be omitted.

At a predetermined timing, the CPU starts processes from step 1600, executes the processes of steps 1201 to 1203 in order, and then proceeds to step 1601. The CPU determines whether the driving assistance operation state is in the off state. When the driving assistance operation state is in the off state, the CPU determines "Yes" in step 1601 and executes the processes of steps 1204 to 1207 as described above in order. Thereafter, the CPU proceeds to step 1695 and temporarily ends this routine.

On the other hand, when the driving assistance operation state is not in the off state (that is, when the driving assistance control is being executed), the CPU determines "No" in step 1601 and executes processes of the steps 1602 and 1603 to be described below in order. Thereafter, the CPU executes the processes of steps 1205 to step 1207 in order, proceeds to step 1695, and temporarily ends this routine.

Step 1602: The CPU acquires information of the target traveling line used in the driving assistance control. Step 1603: The CPU calculates the predicted passage position pbi by using the target traveling line as the proceeding direction of the vehicle 10 on a premise that the vehicle 10 proceeds along the target traveling line (see FIG. 15).

With the above configuration, when the driving assistance operation state is in the on state, the vibration damping control apparatus 20 can calculate the highly accurate predicted passage position pbi by using the target traveling line as the proceeding direction of the vehicle 10. On the other hand, when the driving assistance operation state is in the off state, the vibration damping control apparatus 20 calculates the predicted passage position pbi by using the azimuth angle θ acquired from the position information acquisition device 49 as described above. For example, during the execution of the driving assistance control, it is assumed that the driving assistance operation state has been changed from the on state to the off state by the manual driving operation of the driver. Even in such a case, the ECU 30 calculates the predicted passage position pbi by using the azimuth angle θ acquired from the position information acquisition device 49. Therefore, the ECU 30 can switch information adopted as the proceeding direction of the vehicle 10 from the target traveling line to the azimuth angle θ according to the manual driving operation of the driver, and continue the preview vibration damping control.

First Modified Example of Third Apparatus

In step 1603, the CPU may calculate the predicted passage position pbi as below. The CPU calculates, as the azimuth angle θ' representing the proceeding direction of the vehicle 10, the angle between the direction in which the target traveling line extends and a base line (a line extending in the north direction of the azimuth). The CPU calculates the predicted passage position pbi according to any one of the first calculation method to the fifth calculation method by using the azimuth angle θ' which is calculated based on the target traveling line.

Second Modified Example of Third Apparatus

Even when the driving assistance operation state is in the on state, the ECU 30 may calculate the predicted passage position pbi by using the azimuth angle θ acquired from the position information acquisition device 49. In this configuration, the ECU 30 may estimate the reliability level of the predicted passage position pbi as described above. When the reliability level is the first level, the ECU 30 calculates the predicted passage position pbi by using the azimuth angle θ acquired from the position information acquisition device 49.

On the other hand, when the reliability level is the second level, the accuracy of the predicted passage position pbi calculated by using the azimuth angle θ may be low. Therefore, the ECU 30 calculates the predicted passage position pbi by using the target traveling line. The target traveling line represents a change in the behavior of the vehicle 10 in the future. When the reliability level is the second level, the target traveling line is considered to represent the proceeding direction of the vehicle 10 with higher accuracy than the azimuth angle θ. As described above, when the reliability level is low, the ECU 30 may calculate the predicted passage position pbi by using more highly accurate information (the target traveling line).

Figure 17:
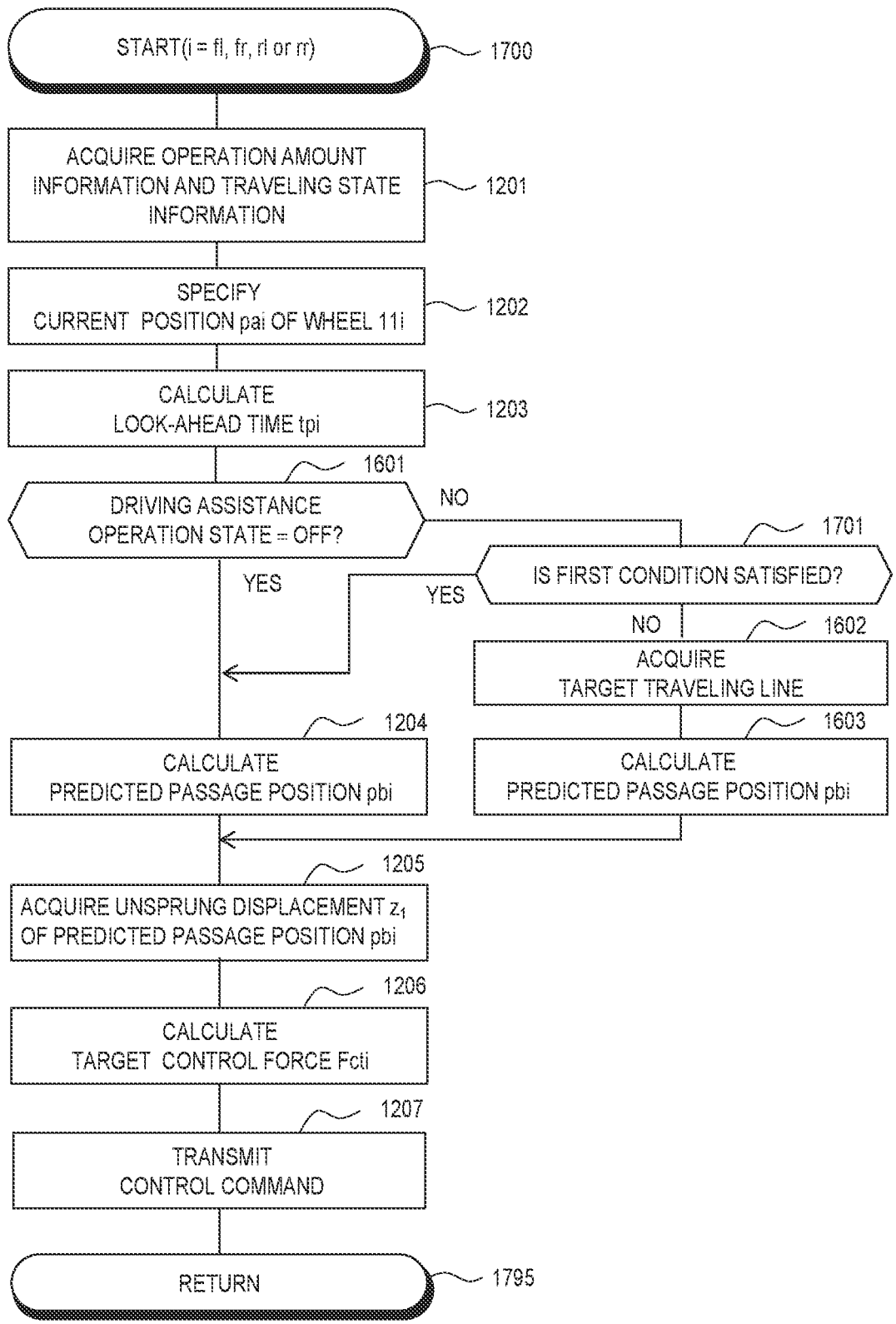
FIG. 17 is a flowchart illustrating a "vibration damping control routine" executed by a CPU of an electronic control device according to a modified example of the third embodiment.

The CPU of this example executes a vibration damping control routine illustrated in FIG. 17 instead of the routine illustrated in FIG. 16. The routine of FIG. 17 is a routine to which step 1701 of FIG. 16 is added. From among the steps illustrated in FIG. 17, the steps in which the same processes as those in the steps illustrated in FIG. 16 are executed are denoted by the same step numbers as those used in FIG. 16 and the description thereof will be omitted.

At a predetermined timing, the CPU starts processes from step 1700, executes the processes of steps 1201 to 1203 in order, and then proceeds to step 1601. When the driving assistance operation state is in the off state, the CPU determines "Yes" in step 1601 and executes the processes of steps 1204 to 1207 as described above in order. Thereafter, the CPU proceeds to step 1795 and temporarily ends this routine.

When the driving assistance operation state is in the on state, the CPU determines "No" in step 1601, proceeds to step 1701, and determines whether the above-described first condition is satisfied. The first condition may be a condition on the look-ahead time tpi, in the same manner as in the second embodiment. When the first condition is satisfied, the CPU determines "Yes" in step 1701 and executes the processes of steps 1204 to 1207 in order. Thereafter, the CPU proceeds to step 1795 and temporarily ends this routine.

On the other hand, when the first condition is not satisfied, the CPU determines "No" in step 1701 and executes the processes of steps 1602 and 1603 as described above in order. Further, the CPU executes the processes of steps 1205 to 1207 in order. Thereafter, the CPU proceeds to step 1795 and temporarily ends this routine.

As described above, the first condition of step 1701 may be a condition on the driving operation amount or the traveling state amount (see the Fourth Modified Example of the Second Embodiment). The first condition may be a condition on the command value from the autonomous operation control (for example, the required acceleration and/or the required deceleration). For example, the first condition may be a condition that is satisfied when the magnitude (the absolute value) of the required acceleration from the autonomous driving control is equal to or less than a predetermined value. Further, the first condition may be a condition on the movement distance Dt (see the Sixth Modified Example of the Second Embodiment).

Further, when the first condition is not satisfied, the CPU may determine whether the second condition is satisfied as described above. When the second condition is satisfied, the CPU may calculate the predicted passage position pbi by using the target traveling line. On the other hand, when the second condition is not satisfied, the CPU may set the target control force Fcti to a small value (for example, zero).

The present disclosure is not limited to the above-described embodiments and modified examples, and various modifications can be adopted within the scope thereof.

The road surface information map 63 does not necessarily have to be stored in the storage device 62 of the cloud 60, and may be stored in the storage device 31 of the vehicle 10. In another example, the ECU 30 may receive a part or all of the road surface information map 63 from another vehicle.

The suspensions 13fl to 13rr may be any type of suspension as long as the wheels 11fl to 11rr and the vehicle body 10a are allowed to be displaced from each other in the vertical direction. Further, the suspension springs 16fl to 16rr may be any springs, such as compression coil springs and air springs.

In the above embodiments, the active actuator 17 is used as the control force generator, but the control force generator is not limited thereto. In other words, the control force generator is an actuator that can adjustably generate a control force, in the vertical direction, for damping vibration in the sprung portion 71 based on a control command including a target control force.

The control force generator may be an actuator driven by a linear motor and the like. In this case, the actuator has characteristics in which the response delay time ta2 becomes shorter as the magnitude of the target control force Fcti becomes larger. The ECU 30 may calculate the response delay time ta2 such that the response delay time ta2 becomes shorter as the amplitude index value Va becomes larger.

The control force generator may be an active stabilizer device (not shown). Examples of the active stabilizer device include a front wheel active stabilizer and a rear wheel active stabilizer. When generating a control force (a left front wheel control force) in the vertical direction between the sprung portion 71 and the unsprung portion 70 corresponding to the left front wheel 11fl, the front wheel active stabilizer generates a control force (a right front wheel control force) in the direction opposite to the left front wheel control force between the sprung portion 71 and the unsprung portion 70 corresponding to the right front wheel 11fr. Similarly, when generating a control force (a left rear wheel control force) in the vertical direction between the sprung portion 71 and the unsprung portion 70 corresponding to the left rear wheel 11rl, the rear wheel active stabilizer generates a control force (a right rear wheel control force) in the direction opposite to the left rear wheel control force between the sprung portion 71 and the unsprung portion 70 corresponding to the right rear wheel 11rr. The configuration of the active stabilizer device is known and is incorporated into the present specification with reference to Japanese Unexamined Patent Application Publication No. 2009-96366. The active stabilizer device includes at least one of the front wheel active stabilizer and the rear wheel active stabilizer.

The control force generator may be a device that generates a control force Fe in the vertical direction using the geometry of the suspensions 13fl to 13rr by increasing/decreasing a braking/driving force on each wheel 11 of the vehicle 10. The configuration of such an apparatus is known and is incorporated in the present specification with reference to Japanese Unexamined Patent Application Publication No. 2016-107778 and the like. The ECU 30 calculates the braking/driving force that generates the control force Fe corresponding to the target control force Fct by using a predetermined method.

Further, such a device includes a driving device (for example, an in-wheel motor) that applies a driving force to each wheel 11 and a braking device (a brake device) that applies a braking force to each wheel 11. The driving device may be a motor, an engine, or the like that applies a driving force to one part of the front wheels and the rear wheels, or four wheels. Further, the control force generator includes at least one of the driving device and the braking device.

Further, the control force generator may include shock absorbers 15fl to 15rr with variable damping forces. In this case, the ECU 30 controls the damping coefficients C of the shock absorbers 15fl to 15rr such that the damping forces of the shock absorbers 15fl to 15rr change by a value corresponding to the target control force Fct.

What is claimed is:

1. A control method of a vehicle, the vehicle including a suspension spring, a control force generator configured to generate a control force between a wheel and a vehicle body portion corresponding to a position of the wheel, one or more acceleration sensors configured to detect vertical acceleration of a sprung portion and output signals indicating a vertical acceleration of the sprung portion as sprung acceleration signals, the sprung portion is a portion closer to the vehicle body than the suspension spring of the vehicle with respect to positions of wheels of the vehicle, and an electronic control unit configured to control the control force generator, the control force being a force in a vertical direction for damping vibration of the vehicle body portion in the sprung portion of the vehicle, the control method comprising:

determining, by the electronic control unit, a look-ahead time that is a time for predicting a position through which the wheel passes in future, the look-ahead time being a time difference between a current time point and a future time point;

calculating, by the electronic control unit, a predicted passage position through which the wheel is predicted to pass at a time point by using the look-ahead time and specific vehicle information having a position of the wheel at the current time point, velocity of the vehicle, and a proceeding direction of the vehicle, the time point being a time point at which the look-ahead time elapses since the current time point;

acquiring, by the electronic control unit, a road surface displacement-associated value at the predicted passage position from road surface information that is data in which position information is associated with the road surface displacement-associated value, the position information indicating a position of a road surface, the road surface displacement associated value being associated with a vertical displacement of the road surface at the position indicated by the position information;

calculating, by the electronic control unit, a final target control force based on the road surface displacement-associated value at the predicted passage position, the final target control force is calculated by determining a first gain with respect to the first target control force according to the look-ahead time and a second gain with respect to a second target control force according to the look-ahead time, the first gain is determined by applying the look-ahead time to a first gain map which defines a relationship between the look-ahead time and the first gain such that the first gain becomes smaller as the look-ahead time is longer and the second gain is determined by applying the look-ahead time to a second gain map which defines a relationship between the look-ahead time and the second gain such that the second gain becomes larger as the look-ahead time is longer; and controlling, by the electronic control unit, the control force generator based on the final target control force.

2. The control method according to claim 1, wherein the predicted passage position is obtained by using, as the specific vehicle information, at least one of acceleration of the vehicle, a yaw rate of the vehicle, and a body slip angle of the vehicle.

3. The control method according to claim 1, further comprising estimating, by the electronic control unit, a level of reliability of the predicted passage position, wherein:

the level of the reliability is a first level at which the reliability is estimated to be high and a second level at which the reliability is estimated to be lower than the reliability of the first level;

the final target control force is calculated such that a second degree is lower than a first degree;

the first degree is a degree of influence on the final target control force by the road surface displacement-associated value at the predicted passage position when the level of the reliability is the first level than when the level of the reliability is the first level; and the second degree is a degree of influence on the final target control force by the road surface displacement-associated value at the predicted passage position when the level of the reliability is the first level than when the level of the reliability is the second level.

4. The control method according to claim 1, further comprising estimating, by the electronic control unit, a level of reliability of the predicted passage position, wherein:

the level of the reliability is a first level at which the reliability is estimated to be high and a second level at which the reliability is estimated to be lower than the reliability of the first level;

the final target control force is calculated based on the first target control force when the level of the reliability is the first level;

the final target control force is calculated based on the first target control force and the second target control force when the level of the reliability is the second level;

the first target control force is a control force that is calculated based on the road surface displacement-associated value at the predicted passage position;

the second target control force is at least one of a feedback control force for damping vibration in a sprung portion and a control force that is calculated by using the road surface displacement-associated value in front of the wheel acquired by a sensor provided in the vehicle;

the final target control force is calculated such that a second degree is lower than a first degree;

the first degree is a degree of influence of the first target control force on the final target control force is lower when the level of the reliability is the first level; and the second degree is a degree of influence of the first target control force on the final target control force is lower when the level of the reliability is the second level.

5. The control method according to claim 1, further comprising estimating, by the electronic control unit, a level of reliability of the predicted passage position, wherein:

the level of the reliability has a first level at which the reliability is estimated to be high and a second level at which the reliability is estimated to be lower than the reliability of the first level; and when the level of the reliability is the second level, the predicted passage position is calculated by using, as the specific vehicle information, at least one of acceleration of the vehicle, a yaw rate of the vehicle, and a body slip angle of the vehicle.

6. The control method according to claim 3, wherein:

the level of the reliability is estimated to be the first level when the look-ahead time is equal to or less than a predetermined time threshold value; and the level of the reliability is estimated to be the second level when the look-ahead time is greater than the predetermined time threshold value.

7. The control method according to claim 3, wherein, based on information on a driving operation amount by a driver, the level of the reliability is estimated to be the first level when a magnitude of the driving operation amount is equal to or less than a predetermined operation amount threshold value, and the level of the reliability is estimated to be the second level when the magnitude of the driving operation amount is greater than the predetermined operation amount threshold value.

8. The control method according to claim 3, wherein, based on information on a traveling state amount of the vehicle, the level of the reliability is estimated to be the first level when a magnitude of the traveling state amount is equal to or less than a predetermined traveling state threshold value, and the level of the reliability is estimated to be the second level when the magnitude of the traveling state amount is greater than the predetermined traveling state threshold value.

9. The control method according to claim 3, wherein, based on a movement distance of the wheel during a time period from the current time point to a time point at which the look-ahead time elapses, the level of the reliability is estimated to be the first level when the movement distance is equal to or less than a predetermined distance threshold value, and the level of the reliability is estimated to be the second level when the movement distance is greater than the predetermined distance threshold value.

10. The control method according to claim 1, further comprising executing, by the electronic control unit, a driving assistance control that has a steering control changing a steering angle of the vehicle such that the vehicle travels along a predetermined target traveling line, wherein:
    when an operation state of the driving assistance control is in an off state, traveling state information being information on the proceeding direction is acquired from an information acquisition device mounted on the vehicle and the predicted passage position is calculated by using the traveling state information; and
    when the operation state of the driving assistance control is in an on state, the predicted passage position is calculated by using the target traveling line as the proceeding direction.

11. The control method according to claim 10, further comprising estimating, by the electronic control unit, a level of reliability of the predicted passage position, wherein:
    the level of the reliability has at least a first level at which the reliability is estimated to be high and a second level at which the reliability is estimated to be lower than the reliability of the first level; and
    based on the operation state of the driving assistance control being in an on state, the predicted passage position is calculated by using the traveling state information when the level of the reliability is the first level and the predicted passage position is calculated by using the target traveling line when the level of the reliability is the second level.

12. The control method according to claim 1, wherein:
    the look-ahead time is calculated based on a calculation delay time until a control command about the final target control force is transmitted to the control force generator and based on a response delay time from a first time to a second time;
    the first time is a time at which the control command is transmitted to the control force generator; and
    the second time is a time at which the control force generator actually generates the control force corresponding to the final target control force.

13. The control method according to claim 1, wherein the road surface displacement associated value has at least one of a road surface displacement indicating a displacement of the road surface in the vertical direction, a road surface displacement velocity indicating a time differential value of the road surface displacement, an unsprung displacement indicating a displacement at an unsprung portion of the vehicle in the vertical direction, and an unsprung velocity indicating a time differential value of the unsprung displacement.

14. A control apparatus of a vehicle, the vehicle including a suspension spring, a control force generator configured to generate a control force between a wheel and a vehicle body portion corresponding to a position of the wheel, one or more acceleration sensor configured to detect vertical acceleration of a sprung portion and output signals indicating a vertical acceleration of the sprung portion as sprung acceleration signals, the sprung portion is a portion closer to the vehicle body than the suspension spring of the vehicle with respect to positions of wheels of the vehicle, the control force being a force in a vertical direction for damping vibration of the vehicle body portion in the sprung portion of the vehicle, the control apparatus comprising
    an electronic control unit configured to control the control force generator,
    wherein the electronic control unit is configured to:
        determine a look-ahead time that is a time for predicting a position through which the wheel passes in future, and the look-ahead time being a time difference between a current time point and a future time point;
        calculate a predicted passage position through which the wheel is predicted to pass at a time point by using the look-ahead time and specific vehicle information having a current position of the wheel, velocity of the vehicle, and a proceeding direction of the vehicle, the time point being a time point at which the look-ahead time elapses since the current time point;
        acquire a road surface displacement-associated value at the predicted passage position from road surface information that is data in which position information indicating a position of a road surface, is associated with the road surface displacement-associated value, the position information indicating a position of a road surface, the road surface displacement-associated value being associated with a vertical displacement of the road surface in the position indicated by the position information;
        calculate a final target control force based on the road surface displacement associated value at the predicted passage position, the final target control force is calculated by determining a first gain with respect to the first target control force according to the look-ahead time and a second gain with respect to a second target control force according to the look-ahead time, the first gain is determined by applying the look-ahead time to a first gain map which defines a relationship between the look-ahead time and the first gain such that the first gain becomes smaller as the look-ahead time is longer and the second gain is determined by applying the look-ahead time to a second gain map which defines a relationship between the look-ahead time and the second gain such that the second gain becomes larger as the look-ahead time is longer; and
        control the control force generator based on the final target control force.

15. The control method according to claim 4, wherein the second target control force for damping vibration in the sprung portion is calculated based on a sprung velocity derived by using the sprung acceleration signals.

16. The control apparatus according to claim 14, further comprising:
    the electronic control unit configured to estimate a level of reliability of the predicted passage position, wherein:
    the level of the reliability is a first level at which the reliability is estimated to be high and a second level at which the reliability is estimated to be lower than the reliability of the first level;

the final target control force is calculated based on the first target control force when the level of the reliability is the first level;

the final target control force is calculated based on the first target control force and the second target control force when the level of the reliability is the second level;

the first target control force is a control force that is calculated based on the road surface displacement-associated value at the predicted passage position;

the second target control force is at least one of a feedback control force for damping vibration in a sprung portion is calculated based on a sprung velocity derived by using the sprung acceleration signals and a control force that is calculated by using the road surface displacement-associated value in front of the wheel acquired by a sensor provided in the vehicle;

the final target control force is calculated such that a second degree is lower than a first degree;

the first degree is a degree of influence of the first target control force on the final target control force is lower when the level of the reliability is the first level; and the second degree is a degree of influence of the first target control force on the final target control force is lower when the level of the reliability is the second level.

17. A control method of a vehicle, the vehicle including a suspension spring, a control force generator configured to generate a control force between a wheel and a vehicle body portion corresponding to a position of the wheel, one or more acceleration sensors configured to detect vertical acceleration of a sprung portion and output signals indicating a vertical acceleration of the sprung portion as sprung acceleration signals, the sprung portion is a portion closer to the vehicle body than the suspension spring of the vehicle with respect to positions of wheels of the vehicle, and an electronic control unit configured to control the control force generator, the control force being a force in a vertical direction for damping vibration of the vehicle body portion in the sprung portion of the vehicle, the control method comprising:

determining, by the electronic control unit, a look-ahead time that is a time for predicting a position through which the wheel passes in future, the look-ahead time being a time difference between a current time point and a future time point;

calculating, by the electronic control unit, a predicted passage position through which the wheel is predicted to pass at a time point by using the look-ahead time and specific vehicle information having a position of the wheel at the current time point, velocity of the vehicle, and a proceeding direction of the vehicle, the time point being a time point at which the look-ahead time elapses since the current time point;

acquiring, by the electronic control unit, a road surface displacement-associated value at the predicted passage position from road surface information that is data in which position information is associated with the road surface displacement-associated value, the predicted passage position is obtained by using, as the specific vehicle information, at least one of acceleration of the vehicle, a yaw rate of the vehicle, and a body slip angle of the vehicle, the position information indicating a position of a road surface, the road surface displacement associated value being associated with a vertical displacement of the road surface at the position indicated by the position information;

calculating, by the electronic control unit, a final target control force based on the road surface displacement-associated value at the predicted passage position, the final target control force is calculated by determining a first gain with respect to the first target control force according to the look-ahead time and a second gain with respect to a second target control force according to the look-ahead time, the first gain is determined by applying the look-ahead time to a first gain map which defines a relationship between the look-ahead time and the first gain such that the first gain becomes smaller as the look-ahead time is longer and the second gain is determined by applying the look-ahead time to a second gain map which defines a relationship between the look-ahead time and the second gain such that the second gain becomes larger as the look-ahead time is longer;

estimating, by the electronic control unit, a level of reliability of the predicted passage position, wherein:

the level of the reliability is a first level at which the reliability is estimated to be high and a second level at which the reliability is estimated to be lower than the reliability of the first level;

the final target control force is calculated such that a second degree is lower than a first degree, the first degree is a degree of influence on the final target control force by the road surface displacement-associated value at the predicted passage position when the level of the reliability is the first level than when the level of the reliability is the first level and the second degree is a degree of influence on the final target control force by the road surface displacement-associated value at the predicted passage position when the level of the reliability is the first level than when the level of the reliability is the second level;

the final target control force is calculated based on the first target control force when the level of the reliability is the first level;

the final target control force is calculated based on the first target control force and the second target control force when the level of the reliability is the second level;

the first target control force is a control force that is calculated based on the road surface displacement-associated value at the predicted passage position;

the second target control force is at least one of a feedback control force for damping vibration in a sprung portion and a control force that is calculated by using the road surface displacement-associated value in front of the wheel acquired by a sensor provided in the vehicle;

the final target control force is calculated such that a second degree is lower than a first degree;

the first degree is a degree of influence of the first target control force on the final target control force is lower when the level of the reliability is the first level;

the second degree is a degree of influence of the first target control force on the final target control force is lower when the level of the reliability is the second level; and controlling, by the electronic control unit, the control force generator based on the final target control force.

* * * * *